United States Patent
Williams et al.

(10) Patent No.: US 12,362,500 B2
(45) Date of Patent: Jul. 15, 2025

(54) PHASED ARRAY ROTMAN LENS FRONT END DEVICES

(71) Applicant: General Radar Corporation, Belmont, CA (US)

(72) Inventors: Jon Williams, San Francisco, CA (US); Dmitry Turbiner, Dallas, TX (US); Brian Williams, Issaquah, WA (US); Christian Kurzke, Saratoga, CA (US); David Powell, Oakland, CA (US); Ilia Lebedev, Cambridge, MA (US); Sergey Klypin, Sammamish, WA (US); Barnabas Fung, San Mateo, CA (US); Devin Matthews, San Francisco, CA (US)

(73) Assignee: General Radar Corporation, Belmont, CA (US)

( * ) Notice: Subject to any disclaimer, the term of this patent is extended or adjusted under 35 U.S.C. 154(b) by 0 days.

(21) Appl. No.: 18/153,801

(22) Filed: Jan. 12, 2023

(65) Prior Publication Data
US 2023/0170627 A1 Jun. 1, 2023

Related U.S. Application Data

(62) Division of application No. 17/026,253, filed on Sep. 20, 2020, now Pat. No. 11,699,861.
(Continued)

(51) Int. Cl.
*H01Q 21/06* (2006.01)
*G01S 7/03* (2006.01)
(Continued)

(52) U.S. Cl.
CPC ............. *H01Q 21/064* (2013.01); *G01S 7/03* (2013.01); *G01S 13/003* (2013.01);
(Continued)

(58) Field of Classification Search
CPC .... H01Q 21/064; H01Q 1/3233; H01Q 3/245; H01Q 15/06; H01Q 21/0031;
(Continued)

(56) References Cited

U.S. PATENT DOCUMENTS

| | | | | |
|---|---|---|---|---|
| 6,031,501 A | * | 2/2000 | Rausch | H01Q 21/0031 343/768 |
| 7,724,197 B1 | | 5/2010 | Hardie et al. | |

(Continued)

FOREIGN PATENT DOCUMENTS

| | | | | |
|---|---|---|---|---|
| EP | 1298452 | | 4/2003 | |
| EP | 1298452 A1 | * | 4/2003 | ........... G01S 13/003 |
| WO | WO 2013045232 | | 4/2013 | |

OTHER PUBLICATIONS

Extended Search Report in European Appln. No. 21817204.7, dated Oct. 26, 2023, 8 pages.

(Continued)

*Primary Examiner* — Donald H B Braswell
(74) *Attorney, Agent, or Firm* — Fish & Richardson P.C.

(57) ABSTRACT

A radar system includes a transmit front end device including a transmit planar component, and a receive front end device including a receive planar component. Each of the transmit planar component and the receive planar component includes a first end, a second end, a cavity space and a linear array of antennas. The cavity space is bounded by beam ports along a first side of the cavity space and by array ports along a second side of the cavity space. The cavity space is in operative communication with the beam ports and with the array ports to form a Rotman lens. A linear array of antennas is located along the second end of the planar component. The transmit planar component and receive planar component are arranged such that the linear (Continued)

array of antennas of the transmit planar component and the linear array of antennas are perpendicular to one another.

16 Claims, 17 Drawing Sheets

Related U.S. Application Data

(60) Provisional application No. 63/034,937, filed on Jun. 4, 2020, provisional application No. 63/034,751, filed on Jun. 4, 2020, provisional application No. 63/034,729, filed on Jun. 4, 2020, provisional application No. 63/034,769, filed on Jun. 4, 2020, provisional application No. 63/034,675, filed on Jun. 4, 2020, provisional application No. 63/033,023, filed on Jun. 1, 2020, provisional application No. 63/032,999, filed on Jun. 1, 2020.

(51) Int. Cl.
| | |
|---|---|
| *G01S 13/00* | (2006.01) |
| *G01S 13/02* | (2006.01) |
| *H01Q 1/32* | (2006.01) |
| *H01Q 3/24* | (2006.01) |
| *H01Q 9/04* | (2006.01) |
| *H01Q 15/06* | (2006.01) |
| *H01Q 21/00* | (2006.01) |
| *H01Q 21/24* | (2006.01) |
| *H01Q 25/00* | (2006.01) |

(52) U.S. Cl.
CPC .......... *H01Q 1/3233* (2013.01); *H01Q 3/245* (2013.01); *H01Q 9/0407* (2013.01); *H01Q 15/06* (2013.01); *H01Q 21/0031* (2013.01); *H01Q 21/24* (2013.01); *H01Q 21/245* (2013.01); *H01Q 25/008* (2013.01); *G01S 2013/0254* (2013.01)

(58) Field of Classification Search
CPC .... H01Q 21/24; H01Q 21/245; H01Q 25/008; H01Q 3/2682; G01S 7/03; G01S 2013/0254; G01S 13/003; G01S 13/931; G01S 2013/0245; G01S 7/024
See application file for complete search history.

(56) References Cited

U.S. PATENT DOCUMENTS

| | | | |
|---|---|---|---|
| 8,344,937 | B2 | 1/2013 | Drake et al. |
| 11,699,861 | B2 | 7/2023 | Williams et al. |
| 2007/0205955 | A1 | 9/2007 | Korisch et al. |
| 2007/0285314 | A1* | 12/2007 | Mortazawi ........... H01Q 1/3233 |
| | | | 343/756 |
| 2010/0141527 | A1 | 6/2010 | Lalezari |
| 2010/0207833 | A1 | 8/2010 | Toso et al. |
| 2011/0156946 | A1 | 6/2011 | Margomenos |
| 2011/0175780 | A1* | 7/2011 | Gatti ................... H01Q 21/005 |
| | | | 343/766 |
| 2013/0027240 | A1 | 1/2013 | Chowdhury |
| 2014/0320345 | A1* | 10/2014 | Caille ...................... H01Q 3/40 |
| | | | 342/373 |
| 2015/0260835 | A1 | 9/2015 | Widmer et al. |
| 2018/0059215 | A1 | 3/2018 | Turbiner et al. |
| 2018/0301808 | A1* | 10/2018 | Olsen ................. H01Q 21/0025 |
| 2018/0375219 | A1 | 12/2018 | Kirino et al. |
| 2021/0373141 | A1 | 12/2021 | Williams et al. |
| 2022/0131258 | A1* | 4/2022 | Eid ........................ H01Q 1/248 |
| 2023/0141288 | A1 | 5/2023 | Williams et al. |

OTHER PUBLICATIONS

5G Americas, "Advanced Antenna Systems for 5G," White Paper, Aug. 2019, 59 pages.
Ahmed et al., "A survey on hybrid beamforming techniques in 5G: Architecture and system model perspectives," IEEE Communications Surveys & Tutorials, Jun. 4, 2018, 20(4):3060-3097.
Brady et al., "Beamspace MIMO for Millimeter-Wave Communications: System Architecture, Modeling, Analysis, and Measurements," IEEE Transactions on Antennas and Propagation, Jul. 2013, 61(7):3814-3827.
Ericsson, "Advanced antenna systems for 5G networks," White Paper GFMC-18:000530, Nov. 2018, 15 pages.
Jankovic et al., "The Multi-Functional Payload Based on Rotman-Lens Beamforming Network," Presented at Proceedings of the 4th ESA Workshop on Advanced Flexible Telecom Payloads, Noordwijk, Netherlands, Mar. 4-8, 2019, 8 pages.
Simon, "Analysis and Synthesis of Rotman Lenses," Presented at Proceedings of the 22nd AIAA International Communications Satellite Systems Conference & Exhibit 2004, Monterey, CA, USA, May 9-12, 2004, 11 pages.
Written Opinion of the International Searching Authority, PCT/US2021/034178, Sep. 14, 2021.

* cited by examiner

PHASED ARRAY ROTMAN LENS FRONT END DEVICES

CROSS REFERENCE TO RELATED APPLICATIONS

The present application is a divisional of U.S. patent application Ser. No. 17/026,253, filed Sep. 20, 2020, which claims priority to U.S. Provisional Patent Application No. 63/032,999, filed Jun. 1, 2020; U.S. Provisional Patent Application No. 63/033,023, filed Jun. 1, 2020; U.S. Provisional Patent Application No. 63/034,675, filed Jun. 4, 2020; U.S. Provisional Patent Application No. 63/034,729, filed Jun. 4, 2020; U.S. Provisional Patent Application No. 63/034,751, filed Jun. 4, 2020; U.S. Provisional Patent Application No. 63/034,769, filed Jun. 4, 2020; and U.S. Provisional Patent Application No. 63/034,937, filed Jun. 4, 2020. The entire contents and disclosure of these applications are incorporated by reference herein.

BACKGROUND OF THE INVENTION

Field of the Invention

The present disclosure relates to apparatus and methods of detecting objects or obstacles and, more particularly, apparatus and methods of detecting objects or obstacles and recognizing objects or obstacles with high accuracy.

Description of the Related Art

A phased array radar system may be a radar system that manipulates the phase of one or more radio waves transmitted by a transmitting and receiving module and uses a pattern of constructive and destructive interference created by the radio waves transmitted with different phases to steer a beam of radio waves in a desired direction.

In modern radar systems, in order to achieve superior resolution and range, it is desirable to maintain a broad bandwidth with minimal losses throughout the system. Moreover, the growing focus toward imaging radar systems is pushing the frequency range for phased array systems into the millimeter-wave range and beyond. However, achieving a constant progressive phase shift between adjacent antennas over a wide bandwidth is a significant challenge at millimeter-wave frequencies.

SUMMARY OF THE INVENTION

In one example embodiment, a radar system comprises a transmit front end device and a receive front end device. The transmit front end device includes a transmit planar component. The receive front end device includes a receive planar component. Each of the transmit planar component and the receive planar component includes a first end, a second end, a cavity space and a linear array of antennas. The second end is located opposite the first end. Electromagnetic waves propagates in propagation directions between the first end and the second end. The cavity space is bounded by beam ports along a first side of the cavity space and by array ports along a second side of the cavity space. The cavity space is in operative communication with the beam ports and with the array ports to form a Rotman lens. A linear array of antennas is located along the second end of the planar component. Each of the antennas is in operative communication with a corresponding one of the array ports. The transmit planar component and receive planar component are arranged such that the linear array of antennas of the transmit planar component and the linear array of antennas are perpendicular to one another.

In another example embodiment, a front end device of a radar system comprises a planar component through which electromagnetic waves propagate. The planar component includes a first end, a second end, a cavity space, and a linear array of antennas. The second end located opposite the first end. The cavity space is bounded by beam ports along a first side of the cavity space and by array ports along a second side of the cavity space. The cavity space is in operative communication with the beam ports and with the array ports to form a Rotman lens. The cavity space is further bounded by radio frequency absorbers along a third side and a fourth side of the cavity space. The second side is located opposite the first side, and the fourth side is located opposite the third side. The array of antennas is located along the second end of the planar component. Each of the antennas is in operative communication with a corresponding one of the array ports. The radio frequency absorbers include triangular teeth having vertices, and the triangular teeth are configured such that lines connecting adjacent vertices are substantially normal to a curvature of a wavefront of the waves in the cavity space.

In yet another example embodiment, a method for detecting an object is provided. The method comprises arranging a linear array of transmit antennas and a linear array of receive antennas to be perpendicular to one another; phase-shifting electromagnetic waves by propagating the waves through a first Rotman lens; transmitting the phase-shifted waves through the linear array of transmit antennas; receiving the transmitted waves reflected by the object through the linear array of receive antennas; and propagating the received waves through a second Rotman lens.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Range-finding systems use reflected waves to discern, for example, the presence, distance and/or velocity of objects. Radio Detection And Ranging (radar) and other range-finding systems have been widely employed in applications, by way of non-limiting example, in autonomous vehicles such as self-driving cars, as well as in wireless communications modems of the type employed, such as in Massive-MIMO (multiple-in-multiple-out) networks, 5G wireless telecommunications, all by way of non-limiting example.

The radar system may include optimized RF front-end device(s) aiding in achieving higher resolution by improving azimuth resolution, elevation resolution, or any combination thereof. Azimuth resolution is the ability of a radar system to distinguish between objects at similar range but different bearings. Elevation resolution is the ability of a radar system to distinguish between objects at similar range but different elevation. Angular resolution characteristics of a radar are determined by the antenna beam-width represented by the −3 dB angle which is defined by the half-power (−3 dB) points. In some embodiments, radar system or phased array system disclosed herein may have a −3 dB beam-width of 1.5 degree or less in both azimuth resolution and elevation resolution. In particular, the radar system can be configured to achieve finer azimuth resolution and elevation resolution by employing an RF front-end device having two linear antennas arrays arranged perpendicularly and a Rotman lens as a phase shifting network, as will be described below.

Figure 1:
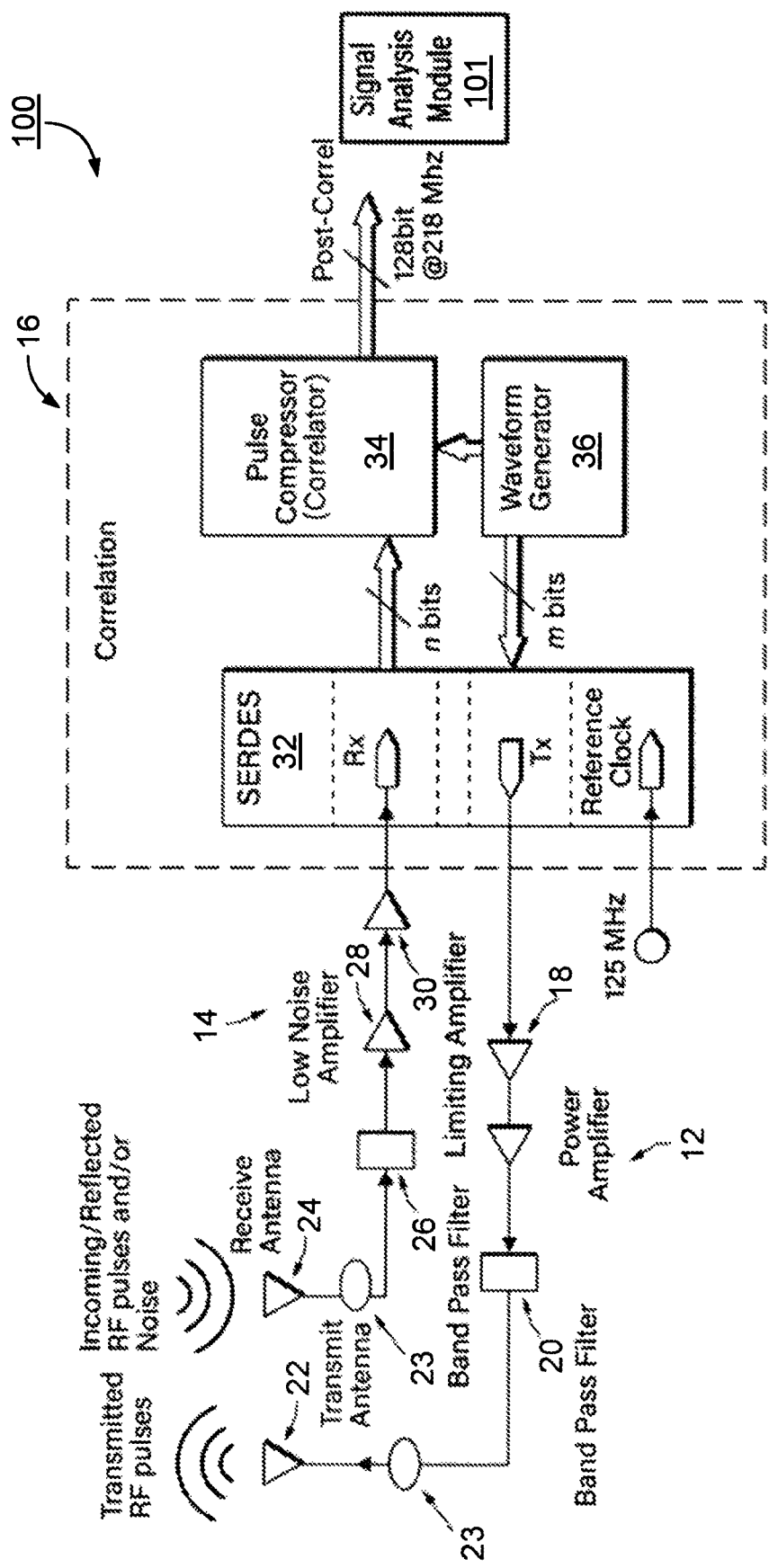
FIG. 1 shows a schematic representation of an example embodiment of a radar system in accordance with the present disclosure.

FIG. 1 shows a schematic illustration of an example radar system 100 having the abovementioned functionalities. The radar system 100 may include a millimeter wave radar that emits a low power millimeter wave operating at 76-81 GHz (with a corresponding wavelength of about 4 mm). The radar system can also operate at other frequency range that is below 76 GHz or above 81 GHz. The radar system may comprise any one or more elements of a conventional radar system, a phased array radar system, an AESA (Active Electronically Scanned Array) radar system, a synthetic aperture radar (SAR) system, a MIMO (Multiple-Input Multiple-Output) radar system, and/or a phased-MIMO radar system. A conventional radar system may be a radar system that uses radio waves transmitted by a transmitting antenna and received by a receiving antenna to detect objects. A phased array radar system may be a radar system that manipulates the phase of one or more radio waves transmitted by a transmitting and receiving module and uses a pattern of constructive and destructive interference created by the radio waves transmitted with different phases to steer a beam of radio waves in a desired direction.

The radar system 100 may be provided on a movable object to sense an environment surrounding the movable object. Alternatively, the radar system may be installed on a stationary object.

A movable object can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle, bicycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be carried by a living subject, or taken off from a living subject, such as a human or an animal.

In some cases, the movable object can be an autonomous vehicle which may be referred to as an autonomous car, driverless car, self-driving car, robotic car, or unmanned vehicle. In some cases, an autonomous vehicle may refer to a vehicle configured to sense its environment and navigate or drive with little or no human input. As an example, an autonomous vehicle may be configured to drive to any suitable location and control or perform all safety-critical functions (e.g., driving, steering, braking, parking) for the entire trip, with the driver not expected to control the vehicle at any time. As another example, an autonomous vehicle may allow a driver to safely turn their attention away from driving tasks in particular environments (e.g., on freeways), or an autonomous vehicle may provide control of a vehicle in all but a few environments, requiring little or no input or attention from the driver.

In some instances, the radar systems may be integrated into a vehicle as part of an autonomous-vehicle driving system. For example, a radar system may provide information about the surrounding environment to a driving system of an autonomous vehicle. An autonomous-vehicle driving system may include one or more computing systems that receive information from a radar system about the surrounding environment, analyze the received information, and provide control signals to the vehicle's driving systems (e.g., steering wheel, accelerator, brake, or turn signal).

The radar system 100 that may be used on a vehicle to determine a spatial disposition or physical characteristic of one or more targets in a surrounding environment. The radar system may advantageously have a built-in predictive model for object recognition or high level decision making. For example, the predictive model may determine one or more properties of a detected object (e.g., materials, volumetric composition, type, color, etc.) based on radar data. Alternatively or additionally, the predictive model may run on an external system such as the computing system of the vehicle.

The radar system may be mounted to any side of the vehicle, or to one or more sides of the vehicle, e.g. a front side, rear side, lateral side, top side, or bottom side of the vehicle. In some cases, the radar system may be mounted between two adjacent sides of the vehicle. In some cases, the radar system may be mounted to the top of the vehicle. The system may be oriented to detect one or more targets in front of the vehicle, behind the vehicle, or to the lateral sides of the vehicle.

A target may be any object external to the vehicle. A target may be a living being or an inanimate object. A target may be a pedestrian, an animal, a vehicle, a building, a sign post, a sidewalk, a sidewalk curb, a fence, a tree, or any object that may obstruct a vehicle travelling in any given direction. A target may be stationary, moving, or capable of movement.

A target object may be located in the front, rear, or lateral side of the vehicle. A target object may be positioned at a range of about 1, 2, 3, 4, 5, 10, 15, 20, 25, 50, 75, or 100 meters from the vehicle. A target may be located on the ground, in the water, or in the air. A target object may be oriented in any direction relative to the vehicle. A target object may be orientated to face the vehicle or oriented to face away from the vehicle at an angle ranging from 0 to 360 degrees.

A target may have a spatial disposition or characteristic that may be measured or detected. Spatial disposition information may include information about the position, velocity, acceleration, and other kinematic properties of the target relative to the terrestrial vehicle. A characteristic of a target may include information on the size, shape, orientation, volumetric composition, and material properties, such as reflectivity, material composition, of the target or at least a part of the target.

A surrounding environment may be a location and/or setting in which the vehicle may operate. A surrounding environment may be an indoor or outdoor space. A surrounding environment may be an urban, suburban, or rural setting. A surrounding environment may be a high altitude or low altitude setting. A surrounding environment may include settings that provide poor visibility (night time, heavy precipitation, fog, particulates in the air). A surrounding environment may include targets that are on a travel path of a vehicle. A surrounding environment may include targets that are outside of a travel path of a vehicle. A surrounding environment may be an environment external to a vehicle.

Referring to FIG. 1, in some embodiments, the radar system 100 may comprise a front end in which at least two phased array modules are arranged perpendicularly with each other and the received signals are processed by the correlator of the phased array module. The processed data (e.g., post correlated data) may further be processed by a signal analysis module 101 for object recognition, constructing point cloud image data and other analysis. In some embodiments, a phased array module of the front end 10 may comprise a transmit logic 12, receive logic 14 and correlation logic 16 illustrated in FIG. 1. The phased array module and SERDES may include those described in U.S. Pub. No. 2018/0059215 entitled "Beam-Forming Reconfigurable Correlator (Pulse Compression Receiver) Based on Multi-Gigabit Serial Transceivers (SERDES)", which is incorporated by reference herein in its entirety.

For example, the transmit logic 12 may comprise componentry of the type known in the art for use with radar systems (and particularly, for example, in pulse compression radar systems) to transmit into the environment or otherwise a pulse based on an applied analog signal. In the illustrated embodiment, this is shown as including a power amplifier 18, band pass filter 20 and transmit antenna 22, connected as shown or as otherwise known in the art.

The receive logic 14 comprises componentry of the type known in the art for use with RADAR systems (and particularly, for example, in pulse compression RADAR systems) to receive from the environment (or otherwise) incoming analog signals that represent possible reflections of a transmitted pulse. In point of fact, those signals may often include (or solely constitute) noise. In the illustrated embodiment, the receive logic includes receive antenna 24, band pass filter 26, low noise amplifier 28, and limiting amplifier 30, connected as shown or as otherwise known in the art.

The correlation logic 16 correlates the incoming signals, as received and conditioned by the receive logic 14, with the pulse transmitted by the transmit logic 12 (or, more aptly, in the illustrated embodiment, with the patterns on which that pulse is based) in order to find when, if at all, there is a high correlation between them. Illustrated correlation logic comprises serializer/deserializer (SERDES) 32, correlator 34 and waveform generator 36, coupled as shown (e.g., by logic gates of an FPGA or otherwise) or as otherwise evident in view of the teachings hereof.

Figure 2:
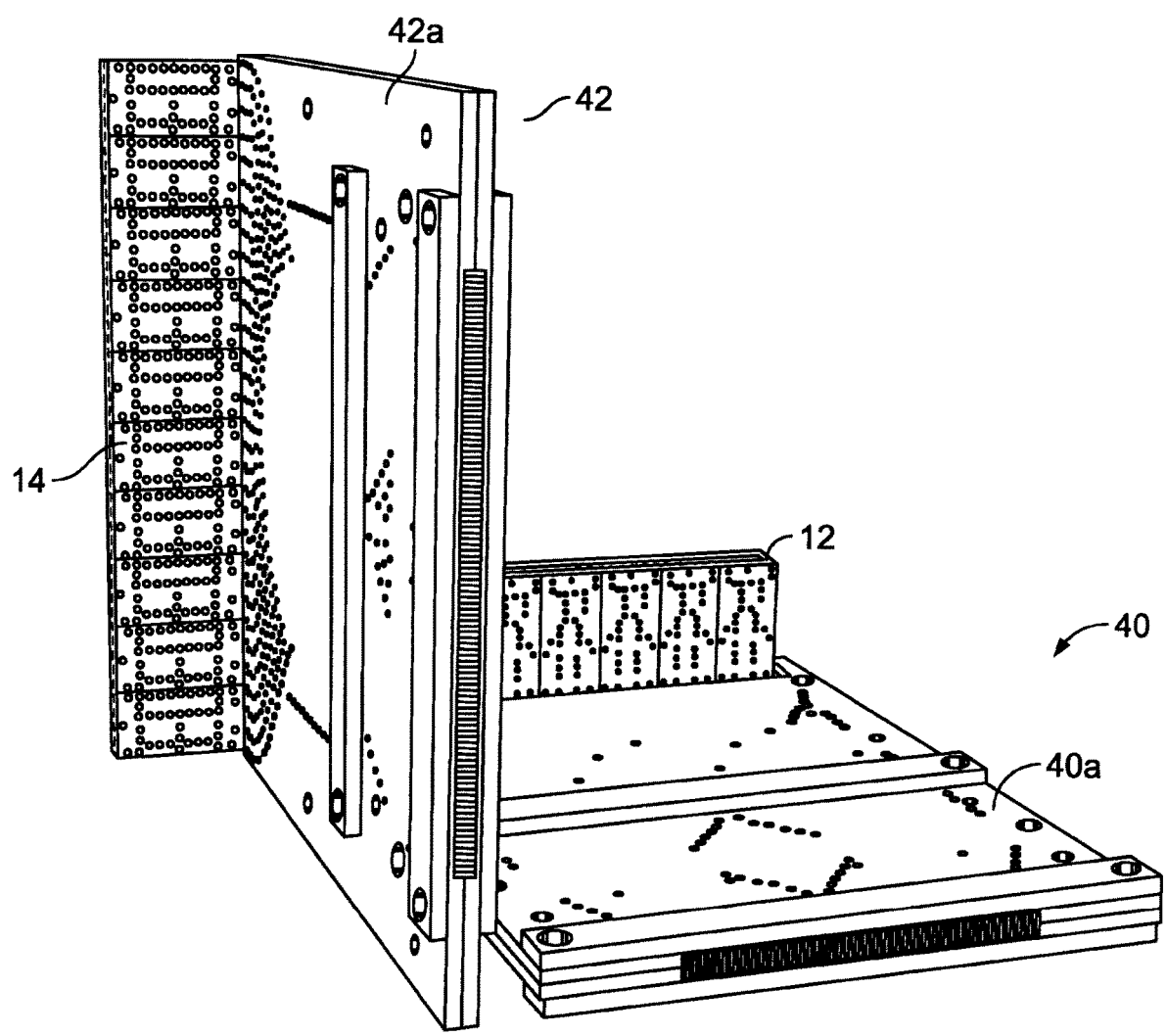
FIG. 2 shows an example embodiment of a front end including a transmit module and a receive module.

FIG. 2 illustrates an example embodiment of a front-end apparatus for a millimeter wave radar. A millimeter wave radar may emit a low power millimeter wave operating at 76-81 GHz (with a corresponding wavelength of about 4 mm). The radar system can also operate at other frequency range that is below 76 GHz or above 81 GHz. The radar system may comprise any one or more elements of a conventional radar system, a phased array radar system, an AESA (Active Electronically Scanned Array) radar system, a synthetic aperture radar (SAR) system, a MIMO (Multiple-Input Multiple-Output) radar system, and/or a phased-MIMO radar system. A conventional radar system may be a radar system that uses radio waves transmitted by a transmitting antenna and received by a receiving antenna to detect objects.

Figure 3:
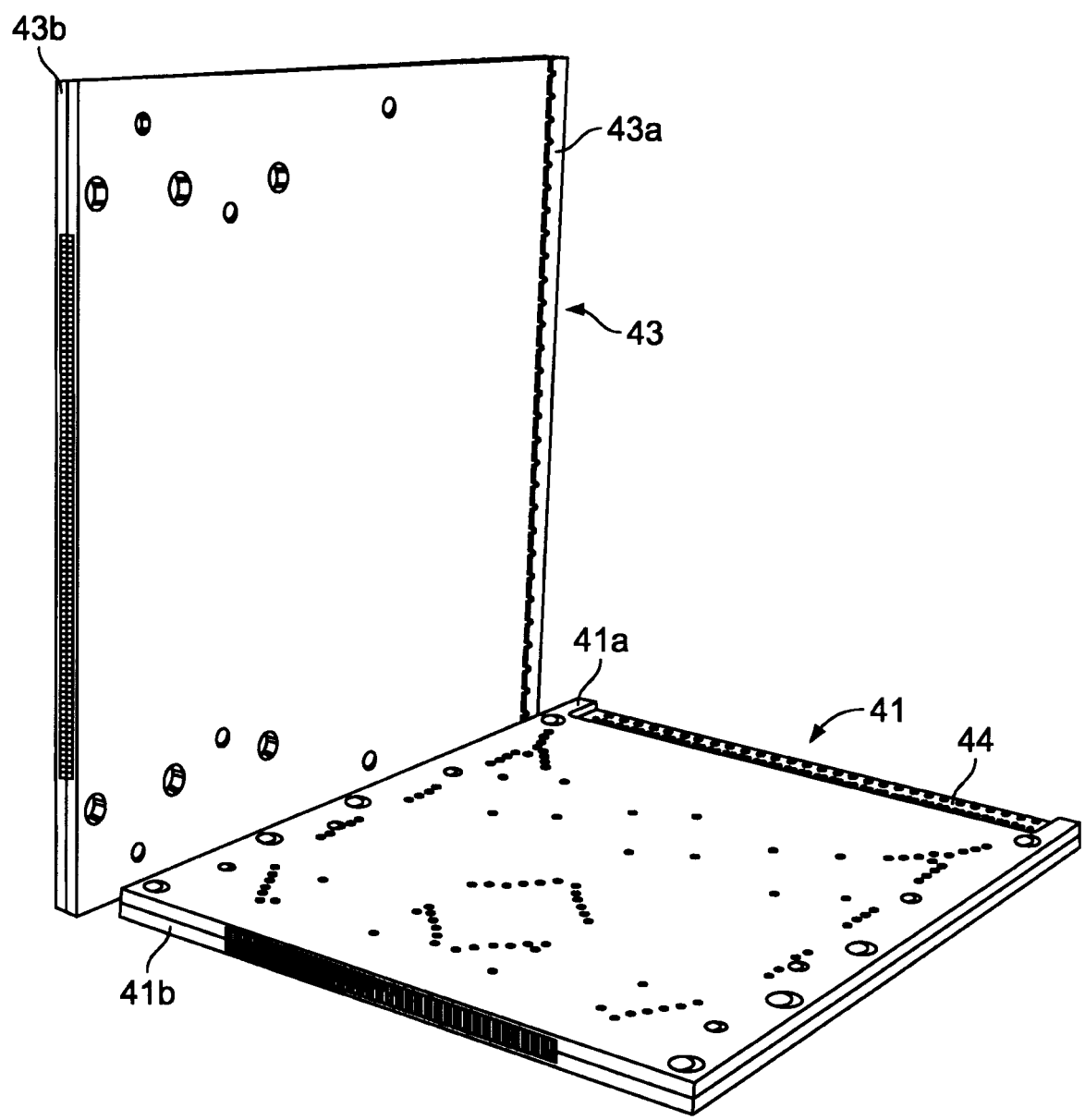
FIG. 3 shows an example embodiment of a transmit planar component and a receive planar component for front end devices of the front end.

As shown in FIG. 2, the front-end apparatus may include phased array modules, i.e., a transmit module 40 and a receive module 42. Each phased array module may include a front end device and a phased array logic. Specifically, the transmit module may include a transmit front end device 40a and a transmit logic 12 while the receive module may include a receive front end device 42a and a receive logic 14. Each of the transmit front end device 40a and the receive front end device 42a may be embodied as a planar component such that the transmit front end device 40a and the receive front end device 42a include a transmit planar component 40c and a receive planar component 42c respectively. FIG. 3 shows the transmit planar component 41 and the receive planar component 43 in isolation. Moreover, each of the planar components 41, 43 may be operatively connected with the corresponding phased array logic 12 or 14 by including, for example, a slot 44 (FIG. 3) to accommodate the corresponding phased array logic.

Figure 4:
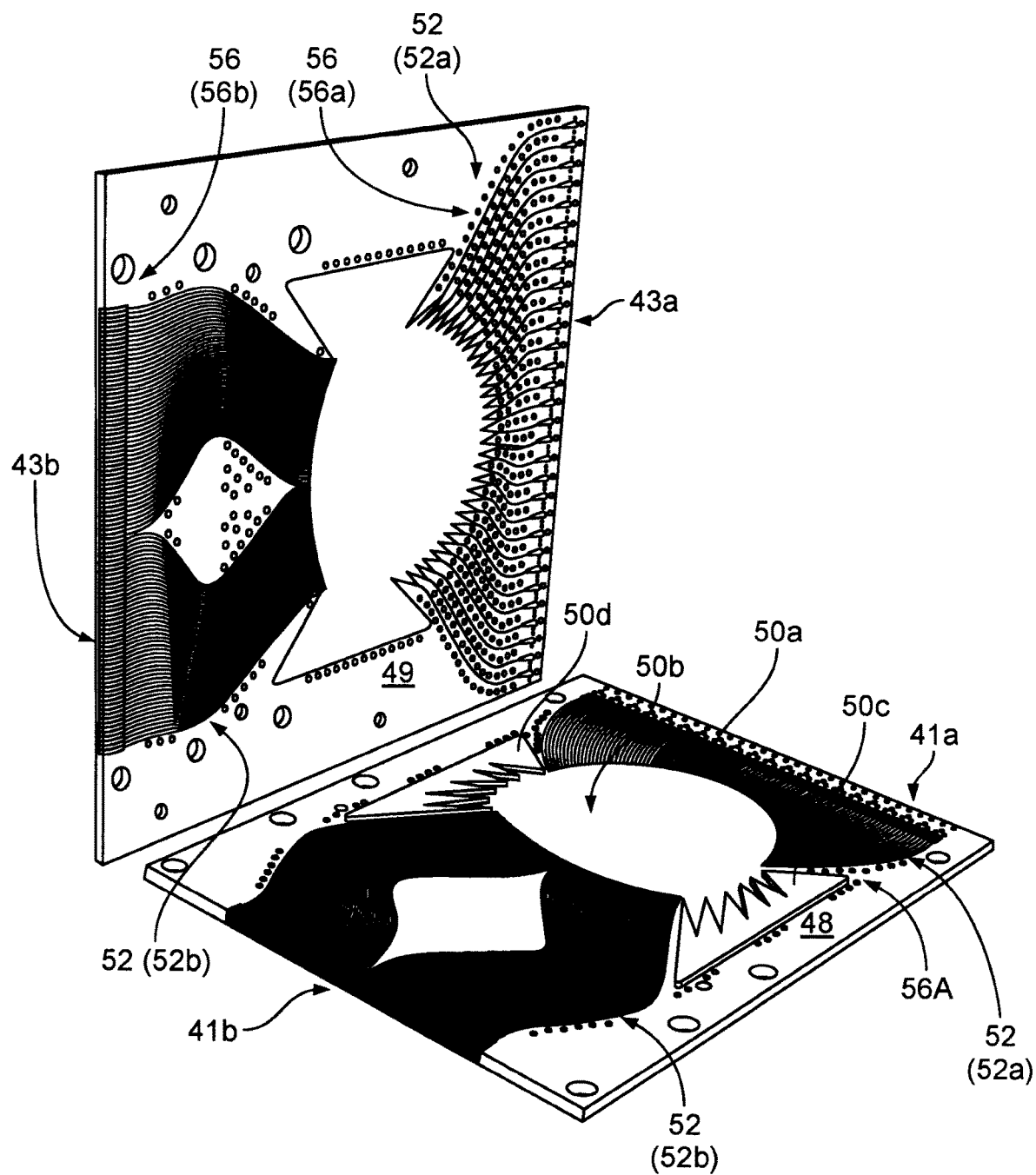
FIG. 4 shows an example embodiment of a half block of the transmit planar component and a half block of the receive planar component where waveguides and a Rotman lens are formed thereon.

The planar component 41/43 may be embodied in the form of a rectangular substrate or plate, as shown in FIG. 3, and may include a first end 41a/43a and a second end 41b/43b that are located on opposite longitudinal ends of the rectangular substrate. The first end 41a/43a of the planar component 41/43 may be operatively connected to the phased array logic 12/14 at the slot 44, and the second end 41b/43b of the planar component 41/43 may include an array of antennas 22/24. The phased array logic 12/14 may connect to the planar component 41/43 at the slot 44 forming a right angle near the first end 41a/43a. The array of transmit antennas 22 and the array of receive antennas 24 may be perpendicular to one another if the transmit planar component 41 and the receive planar component 43 are arranged to be perpendicular to one another (FIGS. 2-4).

The planar component 41/43 may formed from a split block assembly in that the planar component 41/43 is formed by assembling a plurality of blocks. For example, the planar component 41/43 may be formed from half blocks 48/49 that substantially mirror one another along a plane that divides the planar component 41/43 in half thereby forming two symmetrical halves. FIG. 4 only shows one of the two half blocks 48/49.

Figure 5:
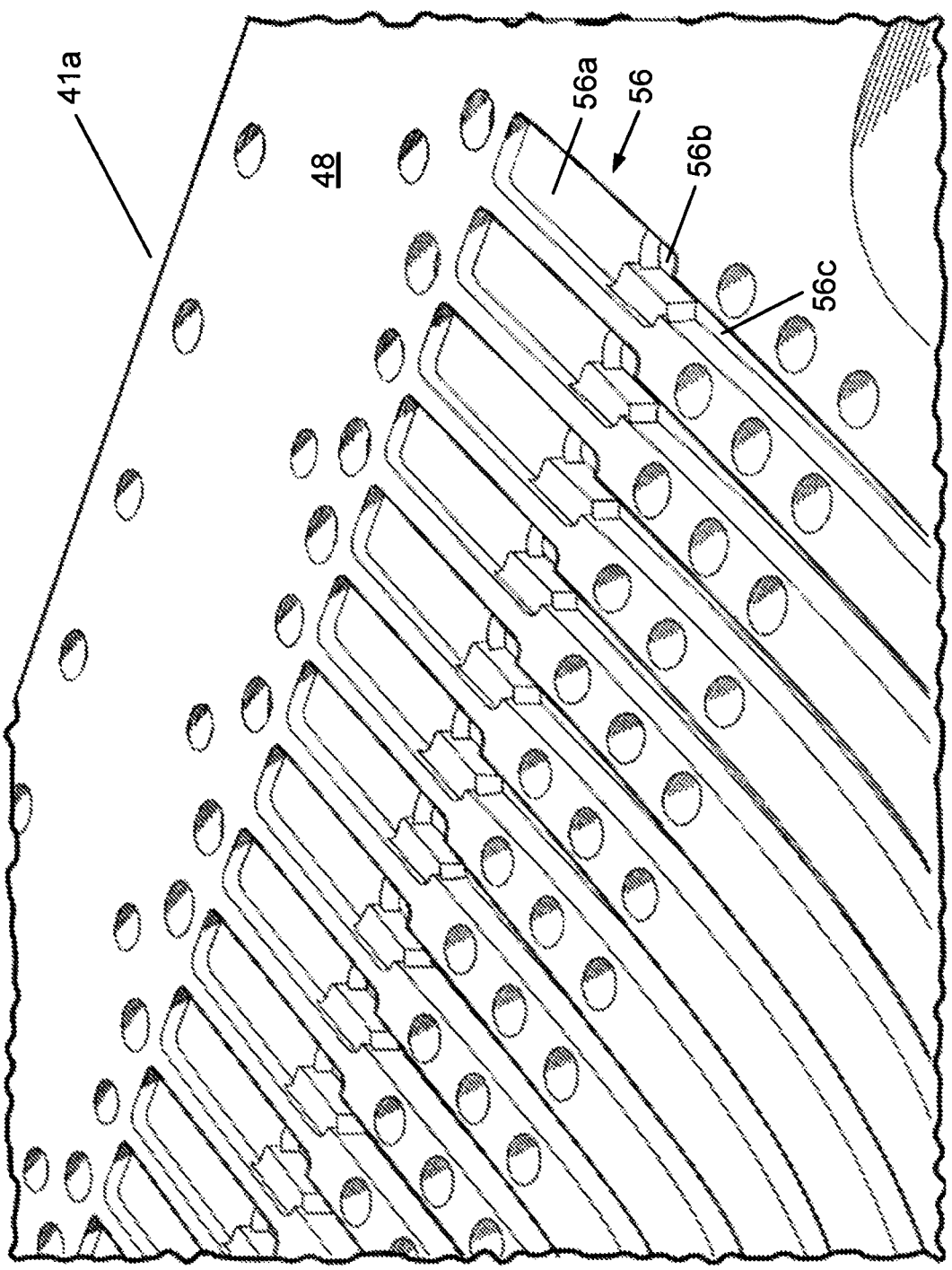
FIG. 5 is a close-up view of an example embodiment of a polarization rotator on the half block of the transmit planar component.
Figure 6:
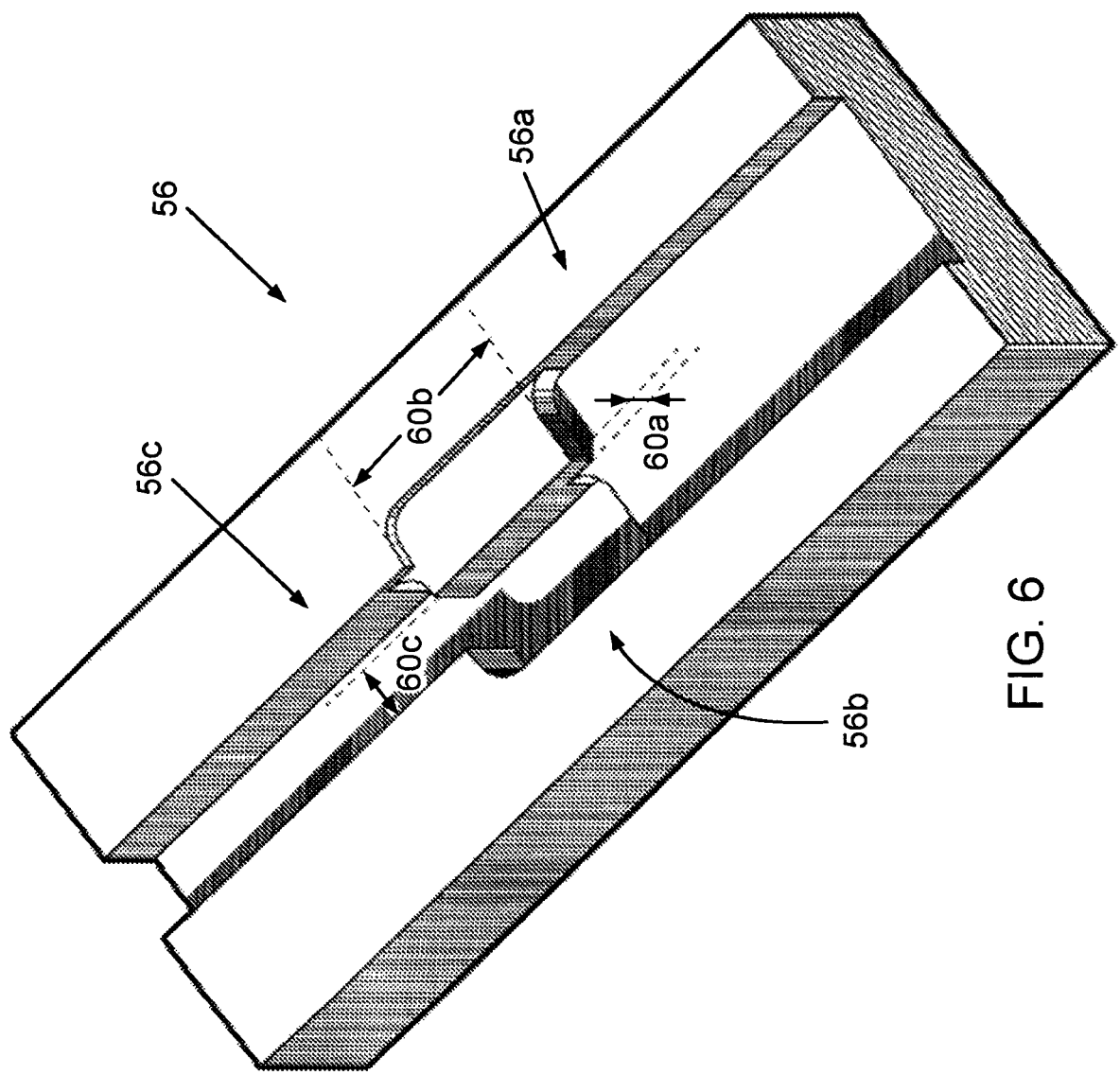
FIG. 6 is an isolated view of the example polarization rotator including a first section, an iris section and a second section.
Figure 7A:
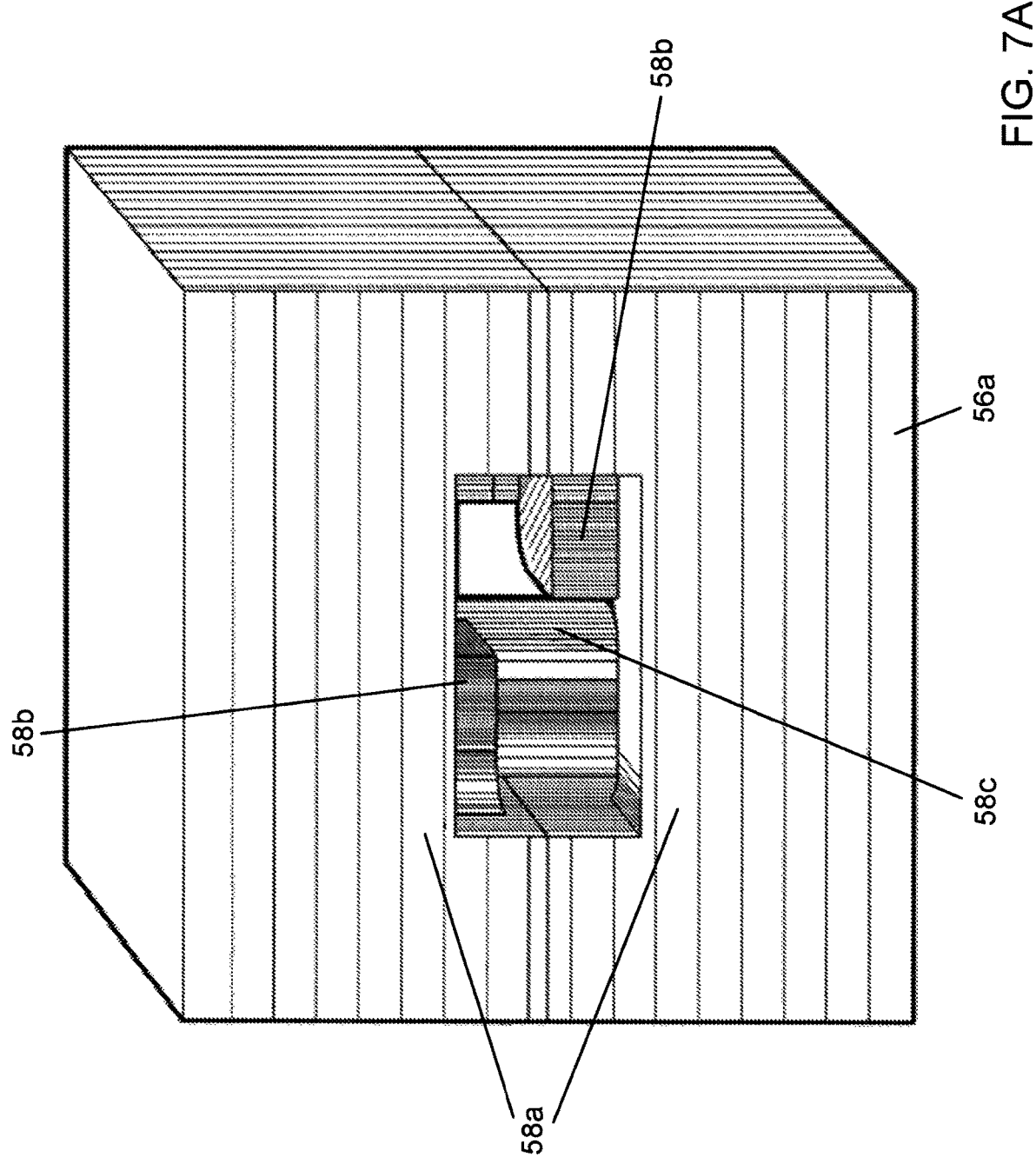
FIG. 7A is a cross-sectional view across the first section of the polarization rotator of a planar component.
Figure 7B:
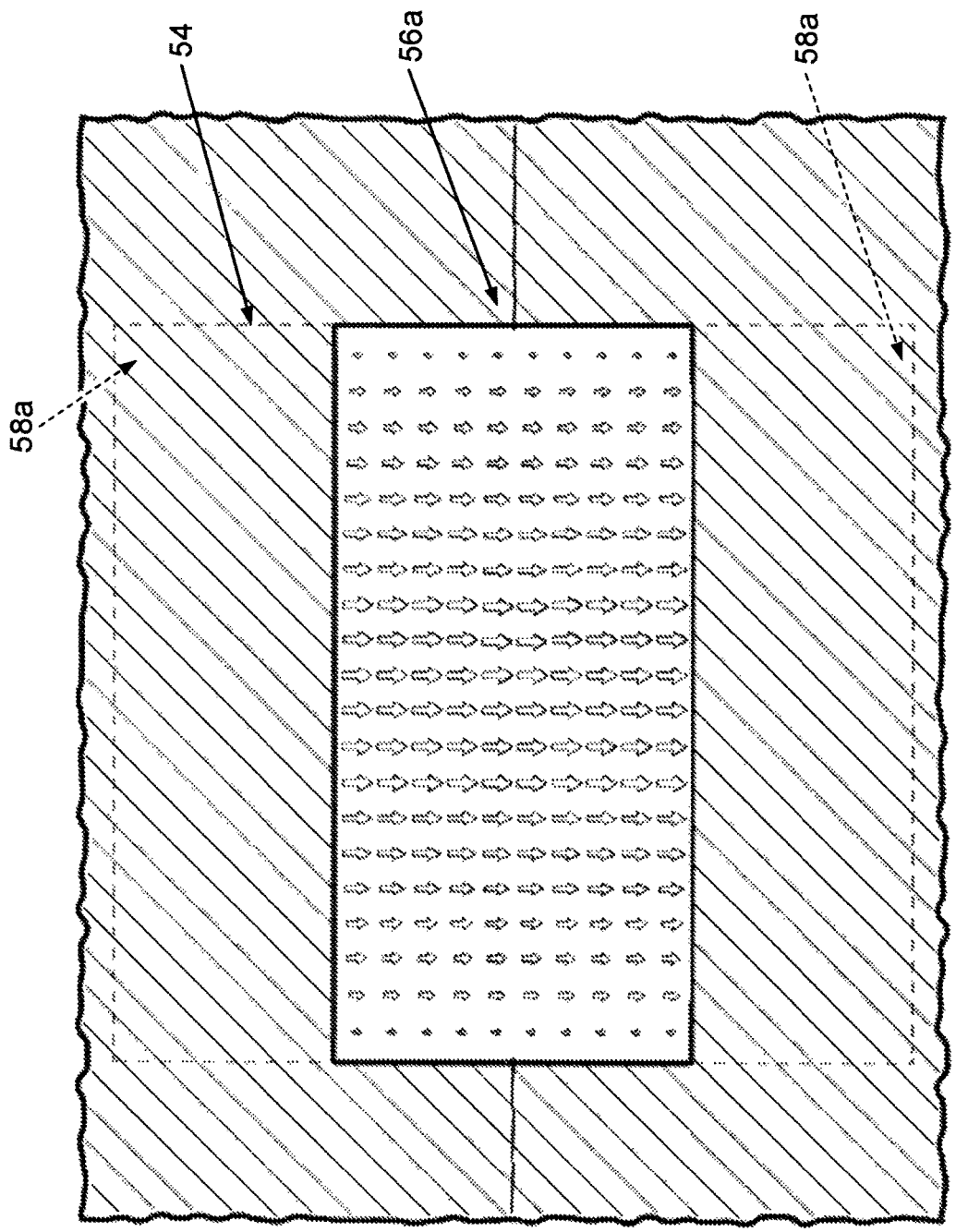
FIG. 7B is a schematic representation of polarization of waves in the first section of the polarization rotator.

The inner surfaces of the blocks of the planar components 41/43 are formed with recesses or cavities that form the inner structure of the planar components 41/43 as will be described below. The recesses or cavities on the blocks 41*a*/43*a* may be formed by a variety of manufacturing methods known in the art (e.g., computer numerical control (CNC) machining, injection molding, or the like) capable to achieving desired fabrication tolerances. As shown in FIGS. 5-6, some curved surfaces (i.e., chamfers) may remain on the planar components 41/43 due to the non-zero diameter of the end bit of the CNC milling machine which may be 20 mils, for example.

The planar component 41/43 may be made of metals (e.g., aluminum), metallic alloys, thermoplastics, other materials known in the art, or a combination thereof. For example, the planar component 41/43 may be made of thermoplastics primarily, and be plated or coated with metals (e.g., gold) or metallic alloys to reduce weight.

In some embodiments, a phased array module 40/42 may include a phase shifting network in the RF front-end device. In some embodiments, the phase shifting network may be implemented using a Rotman lens 23 (FIG. 4) which may be interposed between the phased array logic (the transmit logic 12 or the receive logic 14) and the array of multiple transmit antennas 22/24, as shown in FIG. 1. In some cases, the RF front-end device may comprise a phase shifting network, such as the Rotman lens 23, and a linear antennas array.

The transmit antennas 22 and/or the receive antennas 24 can be any suitable type of antennas. For example, the antennas 22/24 may be a microstrip patch array, Vivaldi antennas, slot coupled patches, horns and others. In some embodiments, the antennas 22/24 may be microstrip bipodal vivaldi antennas that are fed by the Rotman lens 23. For example, the antennas array may be coupled to the array ports of the Rotman lens 23 on a one-to-one basis.

The Rotman lens 23 may include a cavity space 50, and a perimeter of the cavity space 50 may include a first side, a second side that is opposite the first side, a third side, and a fourth side that is opposite the third side. Input ports or beam ports 50*a* may be located on the first side while output ports or array ports 50*b* may be located on the second side of the cavity space 50. The Rotman lens 23 may be configured such that the beam ports 23*a* are near the first end 41*a*/43*a* of the planar component 41/43 while the array ports 23*b* are near the second end 41*b*/43*b* thereof.

If one of the beam ports 23*a* is excited, the electromagnetic waves will be emitted into the cavity space 50 and will reach a corresponding one of array ports 23*b*. The shape of contour with the array ports 23*b* and the length of waveguides 52, which connect the ends 41*a*/41*b*/43*a*/43*b* of the planar component 41/43 and the ports 23*a*/23*b*, are determined so that, a progressive phase taper is created on the array antennas 22/24 and thus a beam is formed at a particular direction in the space.

In the present embodiment, the Rotman lens 23 for the transmit front end device 40*a* has 63 beam ports and 72 array ports, while the Rotman lens 23 for the receive front end device 42*a* has 30 beam ports and 72 array ports. Moreover, the front end 10 has an azimuth scanning angle of 50 degrees and an elevation scanning angle of 40 degrees. These values may vary depending on how the Rotman lens 23 is embodied. Moreover, the front end 10 may include 72 transmit antennas and 72 receive antennas where the antennas 22, 24 are equidistantly spaced apart from one another.

The Rotman lens 23 may serve as a robust and low-cost broadband phase shifting network for the disclosed RF front-end devices 40*a*/42*a* and structures. In these cases, active circuitry may be integrated with the beam ports of the Rotman lens, and the lens itself may then be optimized to provide accurate phasing. In accordance with another aspect of the disclosure, some embodiments may include a Rotman lens 23 with enhanced focusing functionality to provide the phasing with low power loss.

The third side and the fourth side of the Rotman lens 23 may include dummy ports or sidewall absorbers 50*c*, 50*d*, such as radio frequency absorbers, are formed to suppress reflections from the sides of the Rotman lens. The radio frequency absorbers may be made of wave absorbing materials such as Eccosorb® MCS, LS26 or BSR.

Figure 11:
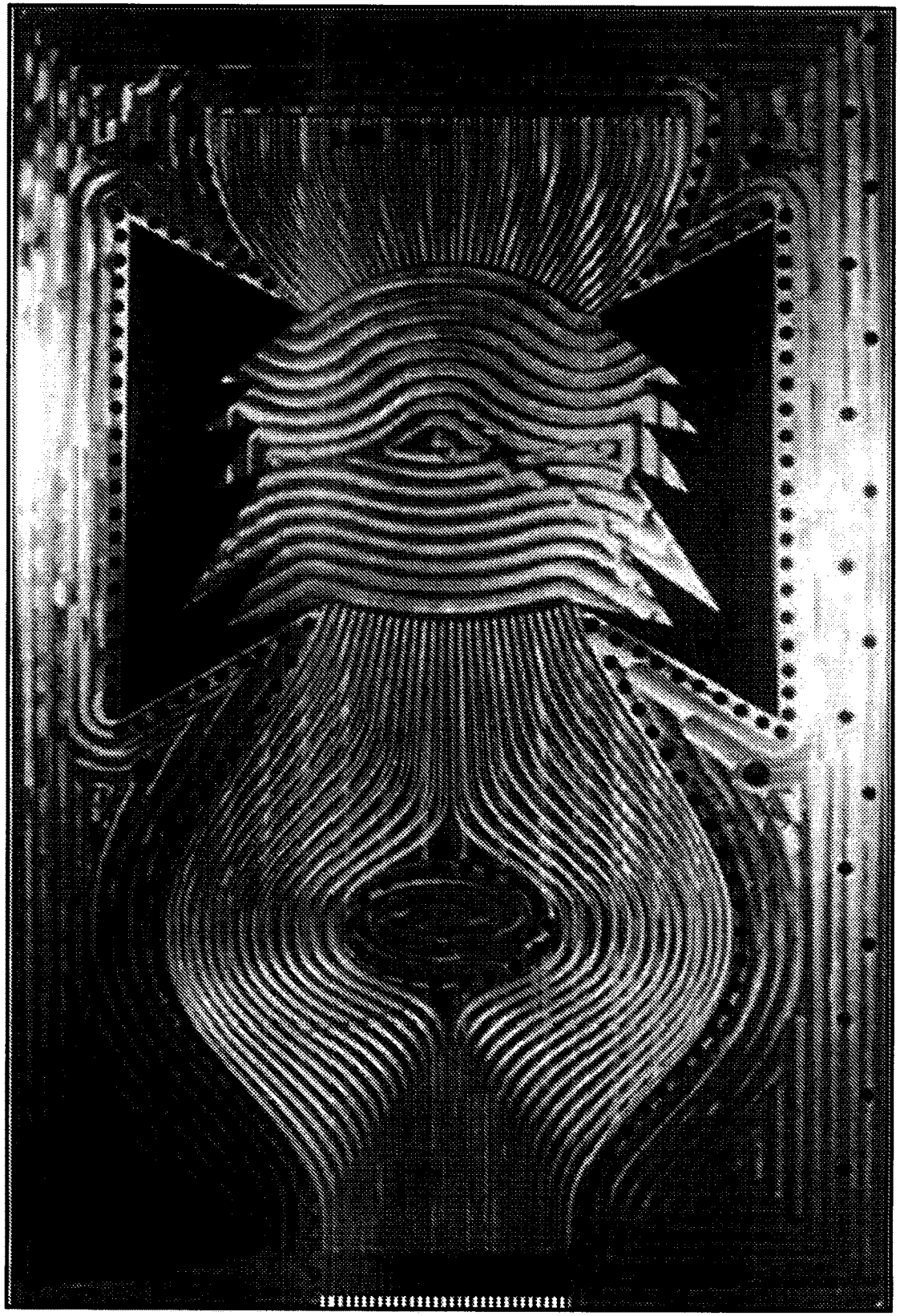
FIG. 11 shows an example embodiment of a half block of a planar component for a front end device including a Rotman lens with sidewall absorbers.
Figure 14:
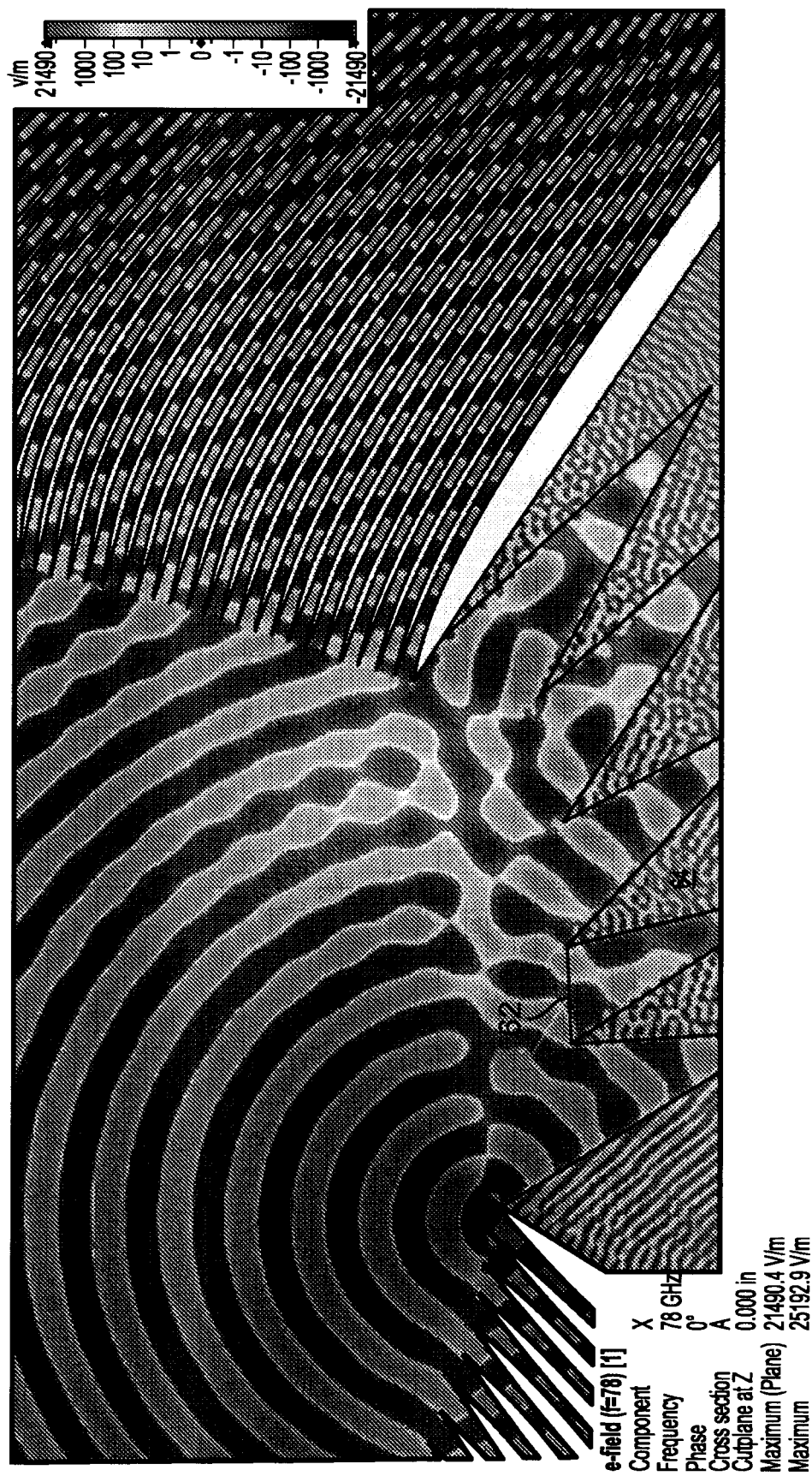
FIG. 14 is an illustration of reflections around example triangular teeth of sidewall absorbers of the Rotman lens.

FIGS. 4 and 11 illustrate embodiments of the Rotman lens 23 with jagged sidewall absorbers 50*c*, 50*d*. Sidewall absorbers 50*c*, 50*d* having shapes shown in FIG. 11 may be effective at attenuating the wavefront of the incident pulses. The shape of the sidewall absorbers 50*c*, 50*d* may include a plurality of sharp triangular "teeth." As shown in FIG. 14, these triangular teeth 64 may be formed such that the imaginary lines 62 extending between adjacent vertices of the triangular teeth 64 pointing into the cavity space 50 of the Rotman lens 23, may be oriented to be substantially normal to the curvature of the wavefront. Under such a configuration, a substantial amount of energy may be captured in-between the teeth 64 thereby allowing for an effective dissipation by the sidewall absorbers 50*c*, 50*d*, as observable in FIG. 14.

Figure 12:
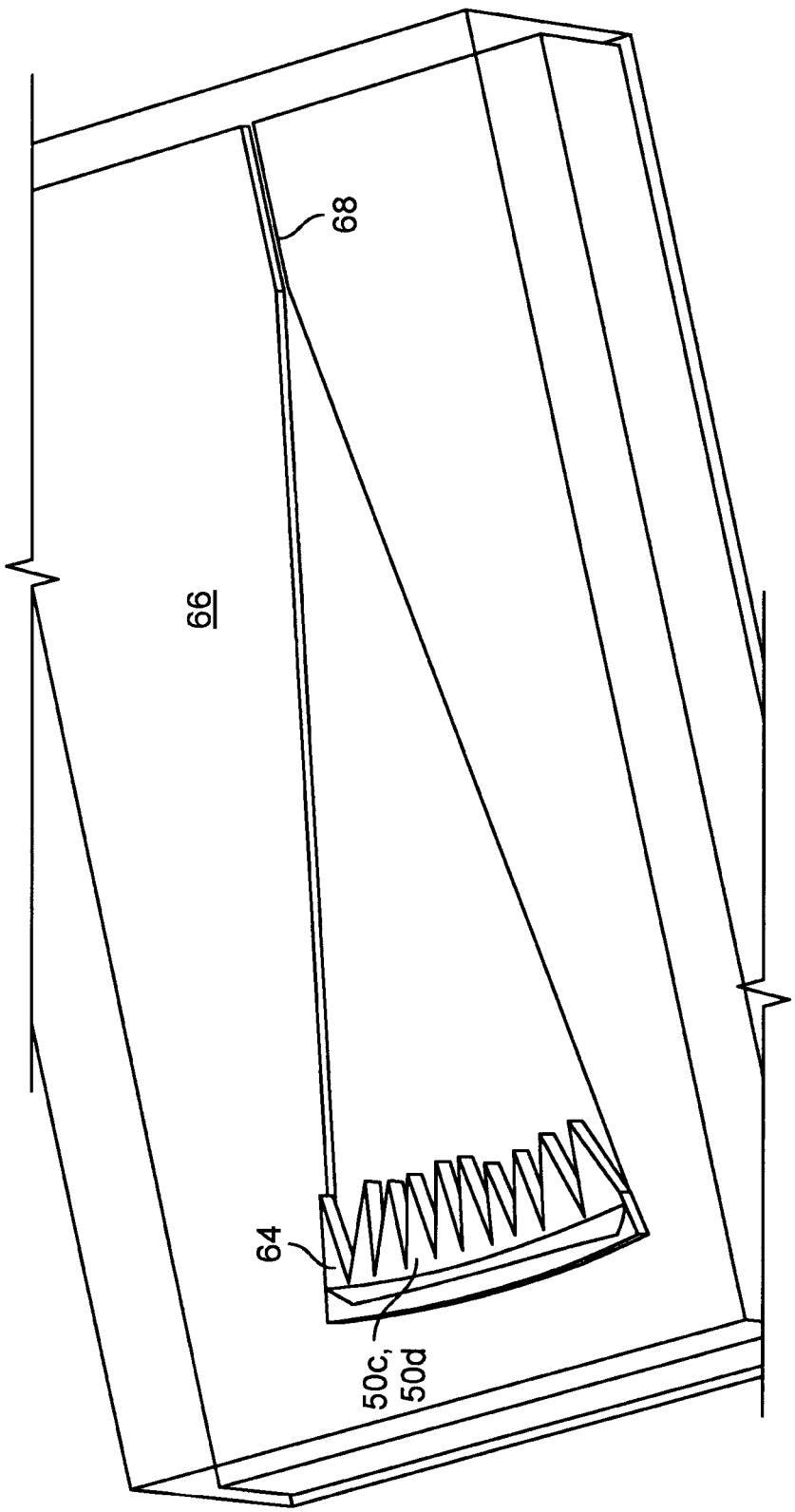
FIG. 12 shows a computer graphic illustration of an example embodiment of a fixture to test performance of a sidewall absorber.

The properties of a sidewall absorber 50*c*/50*d* may be tested on a fixture 66 a simulated embodiment of which is illustrated in FIG. 12. The properties of a sidewall absorber 50*c*/50*d* may be tested on the fixture 66 by feeding a signal into the fixture through its input waveguide port and measuring the reflection coefficient S11 on a Network Analyzer with waveguide millimeter-wave test heads, a simulated embodiment of which is illustrated in FIG. 12. Specifically, by emitting waves through the slot 68 towards the triangular teeth 64 of a sidewall absorber 50*c*/50*d* secured in a depression of the fixture 66 and measuring the amount of reflection from the triangular teeth 64, it is possible to test the effectiveness of the sidewall absorber 50*c*/50*d*.

Figure 10:
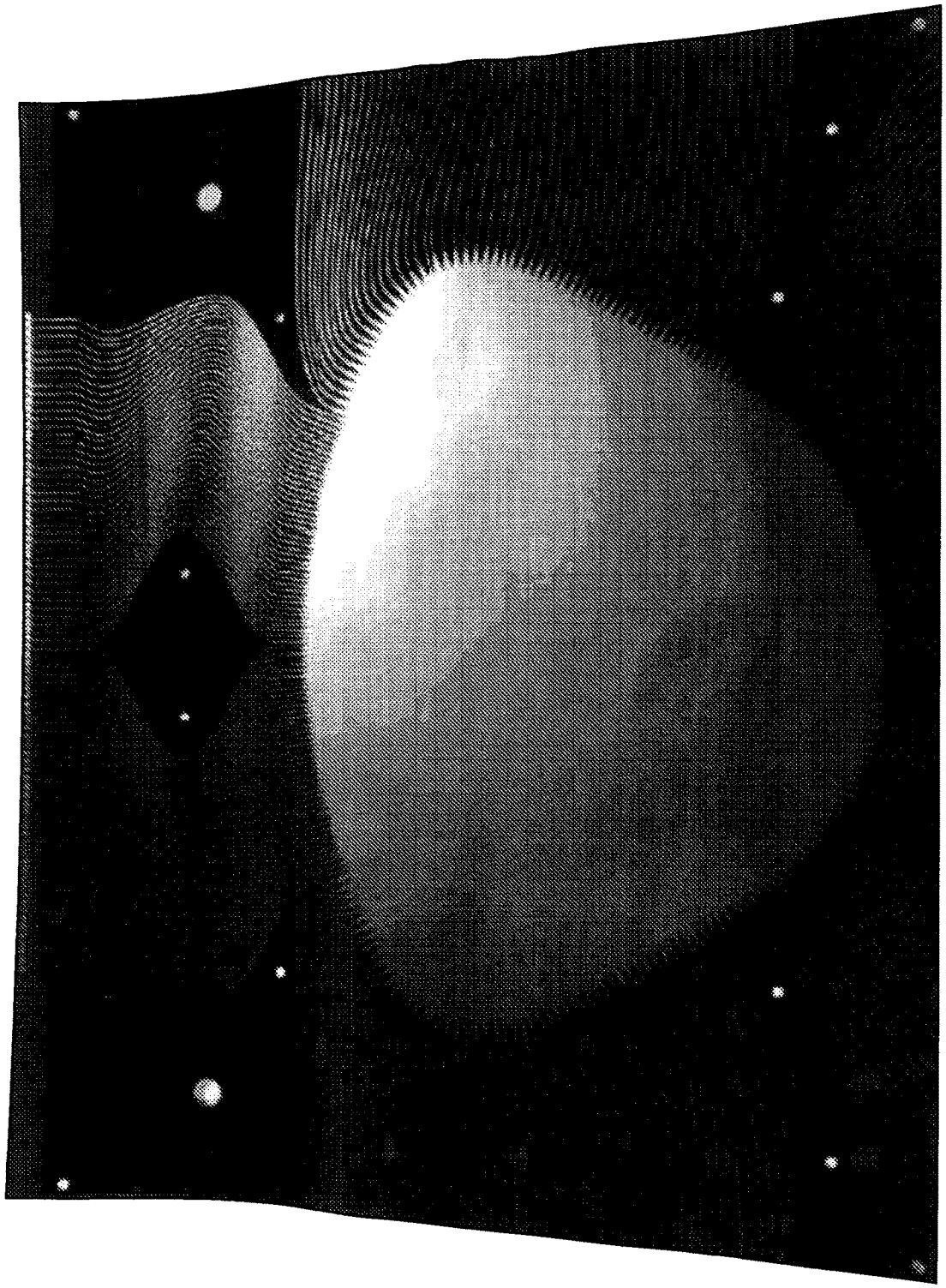
FIG. 10 shows an example embodiment of a front end where a Rotman lens and a transmission lines are formed with microstrips.

As shown in FIG. 10, the Rotman lens 23 can be implemented using waveguides, microstrip, stripline technologies or any combination of the above. In some embodiments, the Rotman lens may be microstrip-based Rotman lens. In some embodiments, the Rotman lens 23 may be a waveguide-based Rotman lens. In some cases, waveguides may be used in place of transmission lines.

In the embodiment of FIGS. 4-9B, the planar component 41/43 further includes waveguides 52 between the first end 41*a*/43*a* and the beam ports 50*a* and between the array ports 50*b* and the second end 41*b*/43*b*. The waveguides 52 may be embodied as rectangular waveguides integrated into the planar component 41/43 such that the waveguides 52 form walls that guide the propagation of electromagnetic waves through the planar component 41/43 during transmission or reception of antenna signals from the first end 41*a* to the second end 41*b* or vice versa.

Each of the waveguides 52 may provide a hollow space through which the electromagnetic waves propagate. While FIGS. 5-6 show only one half of the hollow space of the waveguides 52, the hollow space of the half blocks 48/49 may form an enclosed space that extends along the planar component 41/43 and may take on various geometries to affect the polarization of the waves at different locations of the front end device 40*a*/42*a*. Specifically, the shape of the cross-section of the hollow space may be described based on a reference rectangular cross-section 54 with a given width in the width directions and a given height in the height directions. The waveguide 52 may include a section where the cross-section of the hollow space is as large as the reference rectangular cross-section 54 or smaller than the reference rectangular cross-section 54 as will be described below.

Each of the waveguides 52 of the Rotman lens 23 may further include a polarization rotator 56 to control the polarization of the waves out of and into the phased array logics. FIGS. 5-6 show an example embodiment of the polarization rotator 56 integrated onto the waveguides 52. The polarization rotator 56 may include a first section 56*a*, an iris section 56*b*, and a second section 56*c* which are continuously arranged in a longitudinal direction of the planar component 41/43.

FIG. 5 shows an inner side of a half block 48 of the transmit planar component 41 where the polarization rotator 56 is formed near the first end 41*a*. The polarization rotator 56 may be similarly formed near the first end 43*a* of the receive planar component 43. In the first section 56*a* of the polarization rotator 56 (FIGS. 7A-7B), the waveguide 52 may include a first set of cuboid obstructions 58*a* that protrude into the hollow space in opposite height directions such that the height of the cross-section of the first section 56*a* is less than the given height of the reference rectangular cross-section 54 while the width of the cross-section of the first section 56*a* may be the same as the given width of the reference rectangular cross-section 54. Such height and width may be substantially constant throughout the first section 56*a* in the longitudinal directions.

In the iris section 56*b* of the polarization rotator 56 (FIGS. 8A-8B), the waveguide 52 may include a diagonal set of cuboid obstructions 58*b* that protrude into the hollow space from diagonally opposite corners of the reference rectangular cross-section 54 such that an octagonal, cross-sectional area of the iris section 56*b* is obtained. This cross-sectional area of the iris section 56*b* may be substantially constant throughout the iris section 56*b* in the longitudinal directions.

Figure 8A:
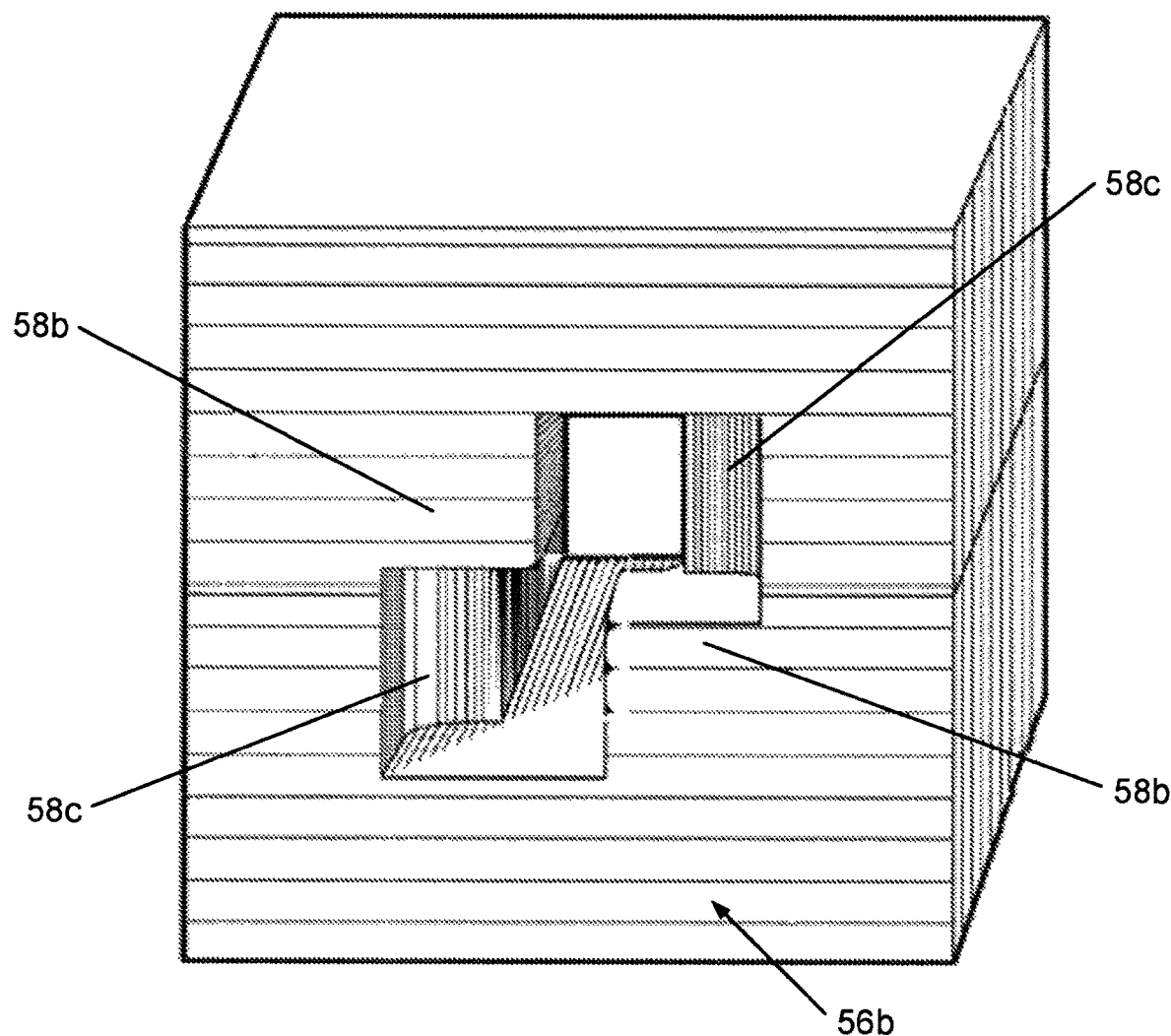
FIG. 8A is a cross-sectional view across the iris section of the polarization rotator of the planar component.
Figure 8B:
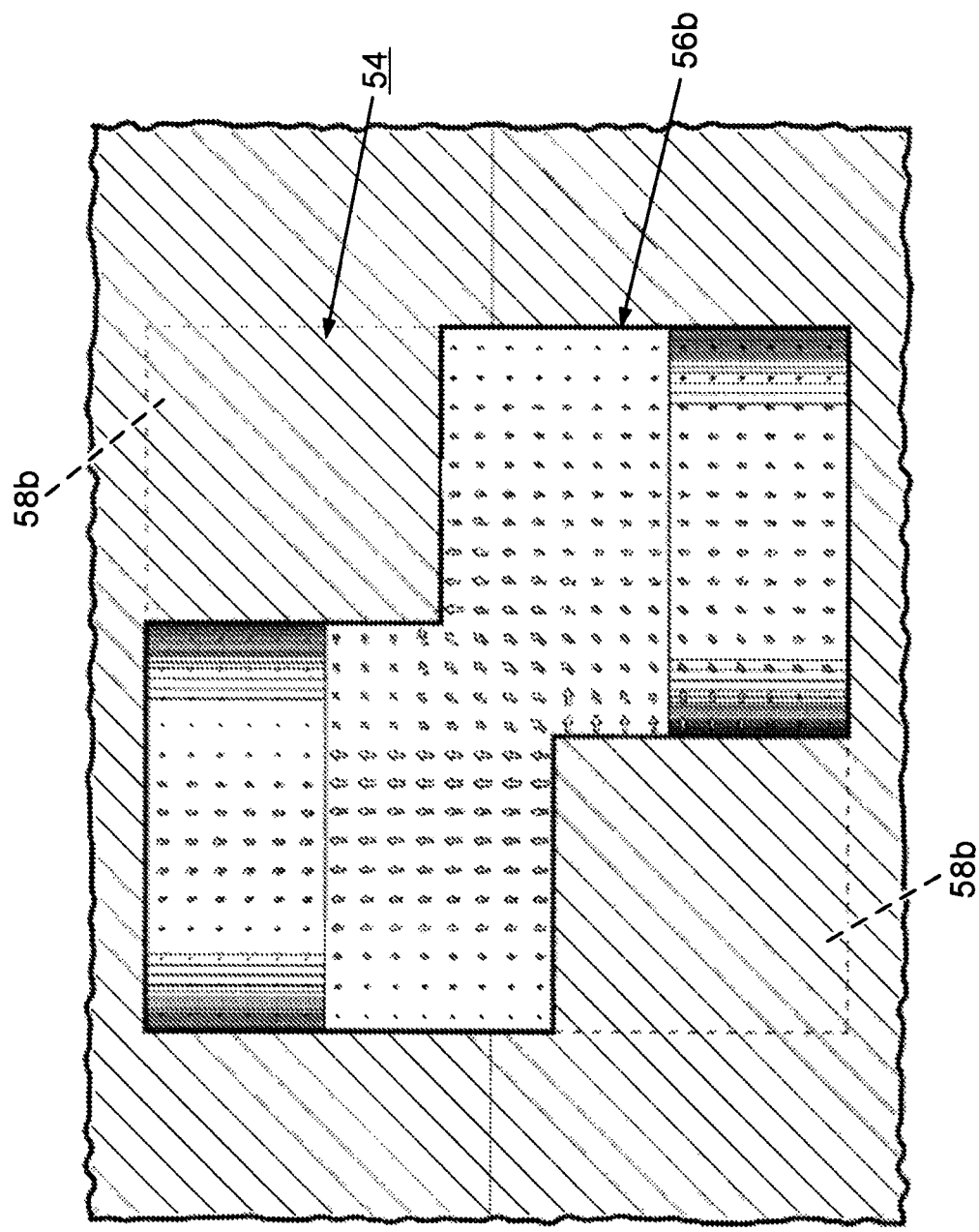
FIG. 8B is a schematic representation of polarization of waves in the iris section of the polarization rotator.

It should be noted that FIG. 8A shows a cross-section across the iris section 56*b* of the polarization rotator 56 observed from the viewpoint of the first section 56*a* such that the second section 56*c* is visible behind the iris section 56*b* while FIG. 8B shows a cross section across the iris section 56*b* of the polarization rotator 56 observed from the viewpoint of the second section 56*c* such that first section 56*a* is visible behind the iris section 56*b*.

Figure 9A:
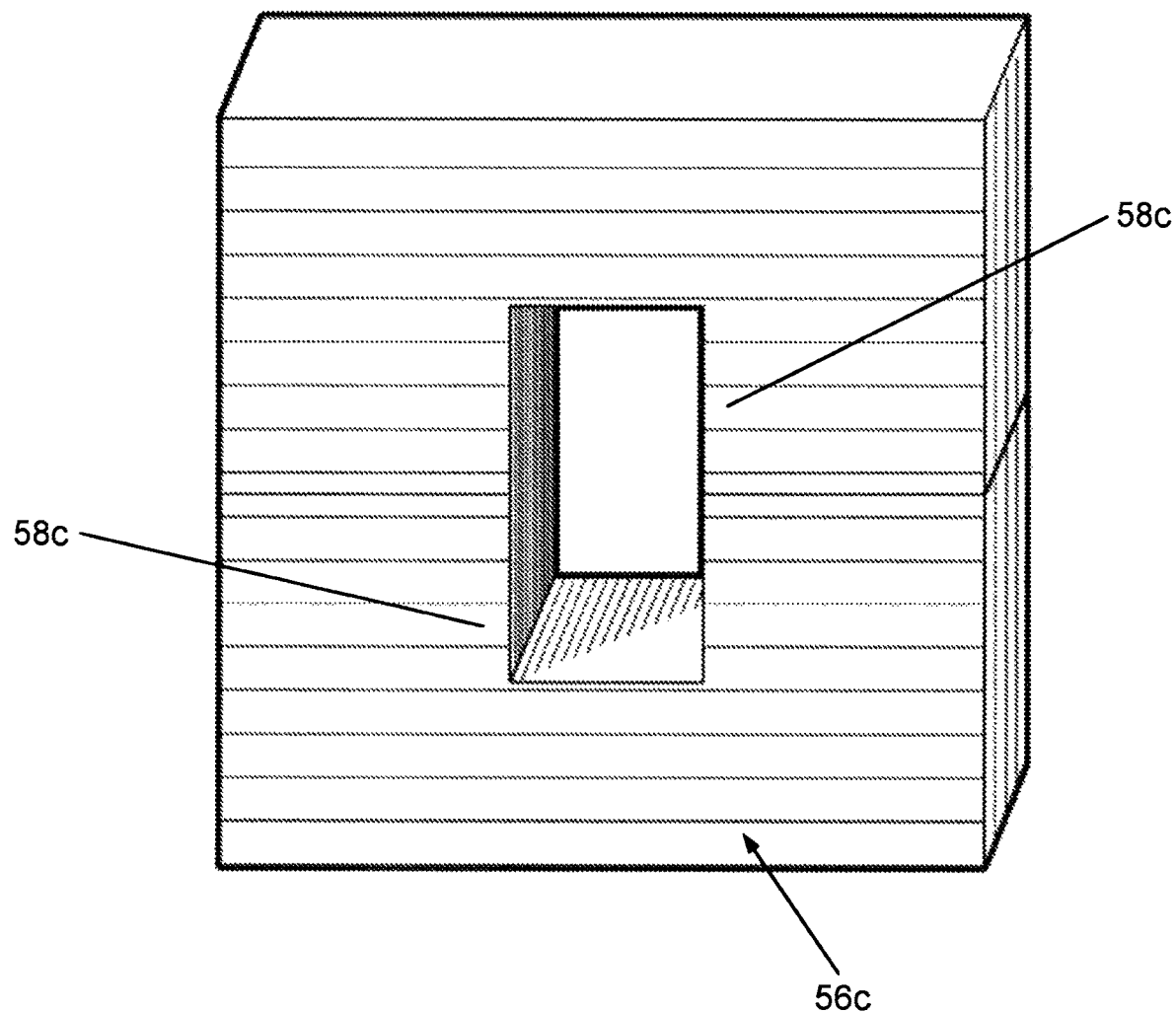
FIG. 9A is a cross-sectional view across the second section of the polarization rotator of a planar component.
Figure 9B:
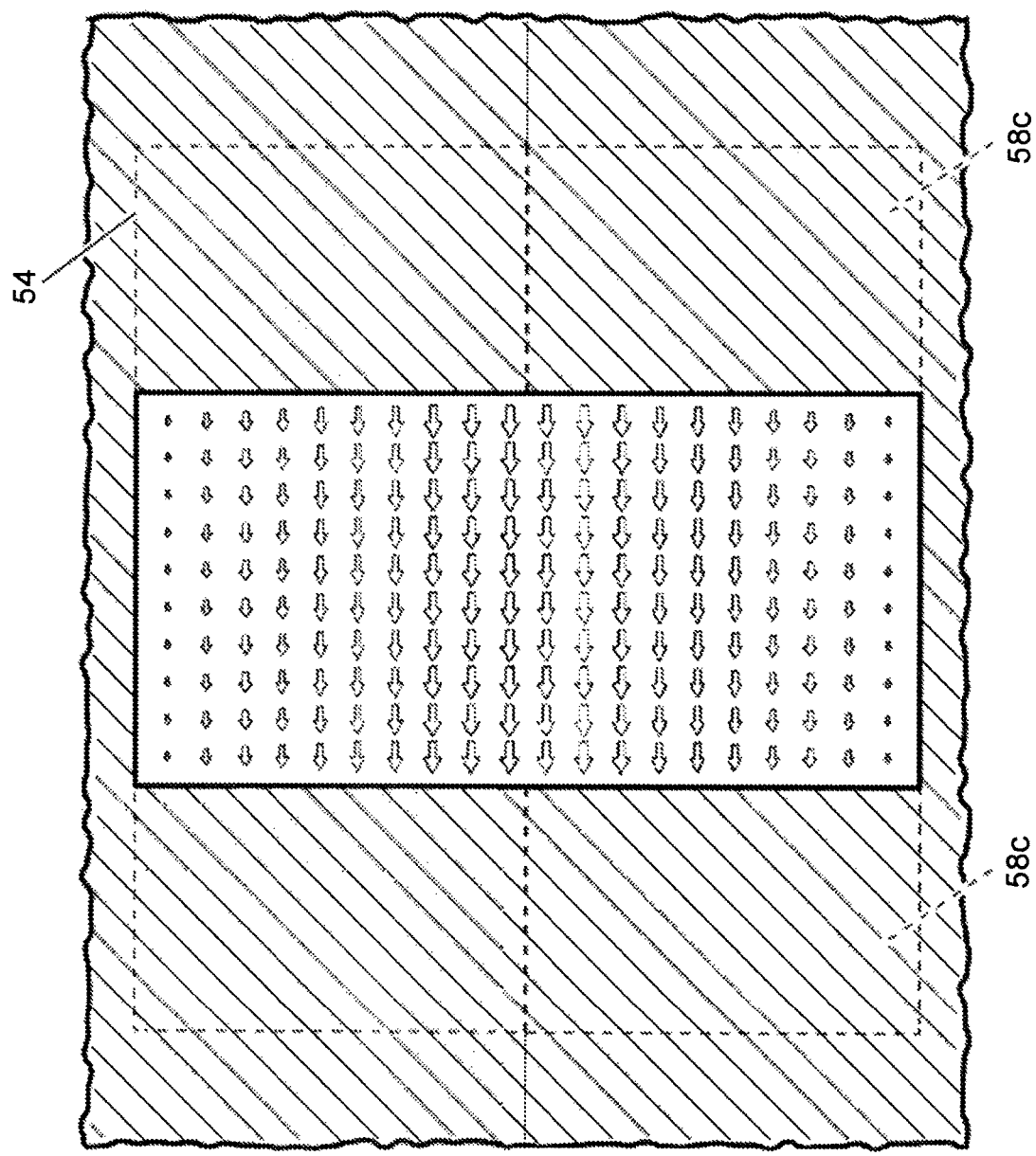
FIG. 9B is a schematic representation of polarization of waves in the second section of the polarization rotator.

In the second section 56*c* of the polarization rotator 56 (FIGS. 9A-9B), the waveguide 52 may include a second set of cuboid obstructions 58*c* that protrude into the hollow space from opposite width directions such that the width of the cross-section of the second section 56*c* is less than the given width of the reference rectangular cross-section 54 while the height of the cross-section of the second section 56*c* may be the same as the given height of the reference rectangular cross-section 54 (FIG. 9A). Such height and width may be substantially constant throughout the second section 56*c* in the longitudinal directions.

Various dimensions of the iris section 56*b* (FIG. 6) can affect different parameters of the radar system. The height 60*a* of the cuboid obstructions 58*b* in the iris section 56*b* can be used to tune total effective bandwidth and can affect a balance between bandwidth and central band frequency. The length 60*b* of the cuboid obstructions 58*b* of the iris section 56*b* can be used to tune the effective band center. The gap 60*c* of the iris section 56*b*, which is measured between a sidewall of the cuboid obstructions 58*b* and a sidewall of the second section 56*c*, can affect both the bandwidth and insertion loss of the polarization rotation. In one example embodiment, the height 60*a* of the cuboid obstructions 58*b* of the iris section 56*b*, the length 60*b* of the cuboid obstructions 58*b* of the iris section 56*b*, and the gap 60*c* of the iris section 56*b* may respectively be 0.017 in., 0.094 in., and 0.035 in. Moreover, the entire length of the polarization rotator that is the combined length of the first section 56*a*, the iris section 56*b*, and the second section 56*c* may be less than $2\lambda$ where $\lambda$ is equal to a wavelength of the waves traveling through the front end.

Figure 13:
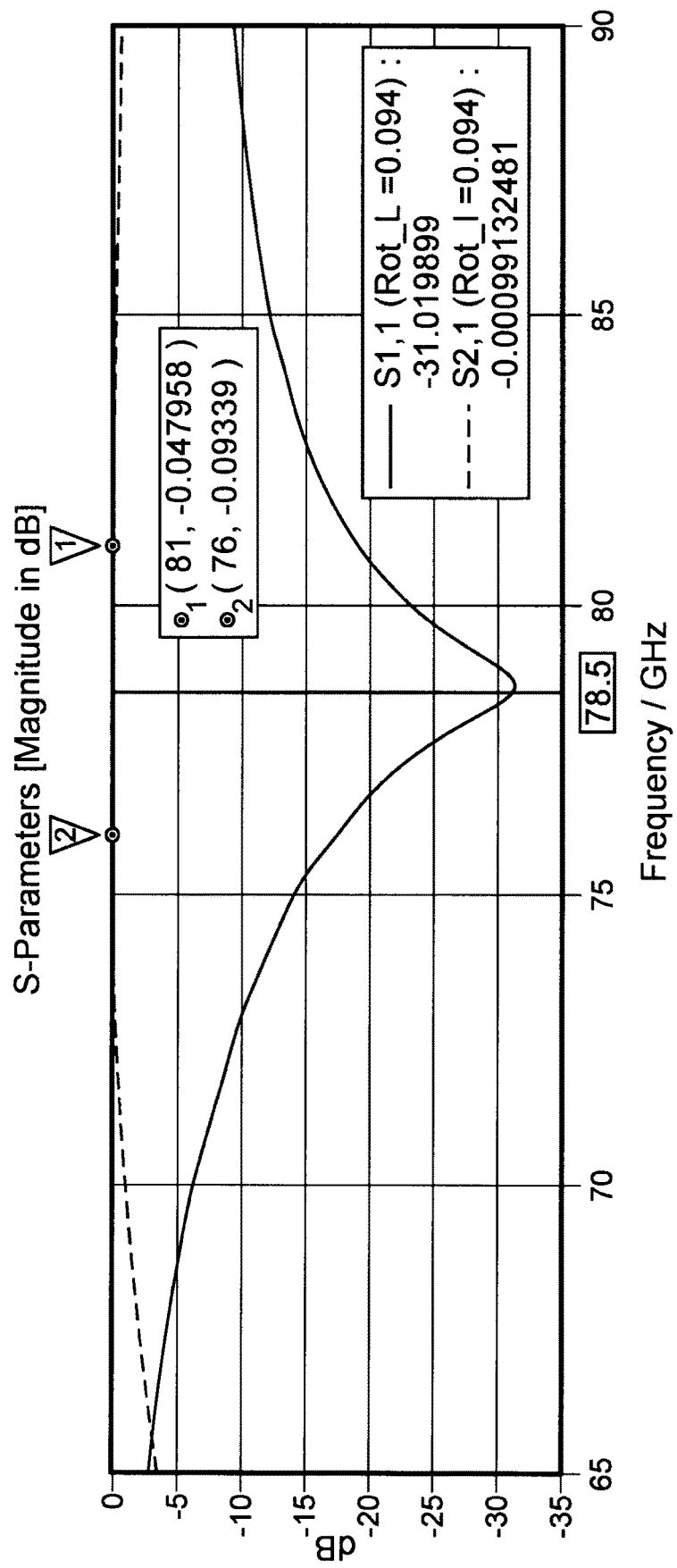
FIG. 13 is a graph showing the minimum reflection (S11) and the maximal transmission (S12) for the iris section for given dimensions of the iris section.

The aforementioned dimensions of the iris section 56*b* may affect the performance of the antenna which may be described in terms of S-parameters (where SNM represents the power transferred from Port M to Port N in a multi-port network), as shown in the graph of FIG. 13. In one embodiment of the iris section 56, the dimensions of the iris section 56*b* may control the locations of a minima of S11 (minimum reflection) and a maxima of S21 (maximum transmission) as well as the beamwidth. In the example of FIG. 13, S11 has a minima of about −31.019899 dB at 78.5 GHz while S21 has a maxima of about −0.00099132481 dB.

Due to the complex interaction of the tuning parameters, a systematic tuning approach to getting the needed bandwidth, central frequency and insertion loss are needed when designing the polarization rotator 56. The process for tuning should be to pick nominal values for the three aforementioned parameters. Nominal values are based on the waveguide 52 selected and are typically ¼ to 1 times the waveguide long dimension depending on the parameter. Once nominal values are chosen length for the iris section should be tuned to achieve the needed central frequency response. After central frequency response is achieved, the height of the cuboid obstruction 58*b* should be tuned to get the desired bandwidth and insertion loss. If bandwidth and insertion loss are not achieved, the gap of the iris section 56*b* can be changed to help insertion loss. The gap of the iris section should typically be 30-50% of the long dimension of the waveguide 52. Deviations from this lead to very narrow bandwidths or high insertion loss. Once the desired insertion loss and bandwidth are achieved a re-tune of the length of the iris section will shift the central frequency back to the desired position from the shift due to adjustments to parameters such as the height of the cuboid obstructions 58*b* and the gap 60*c* of the iris section 56.

As shown in FIG. 4, the waveguides 52 extending between the first end 41*a*/43*a* and the beam ports 50*a* of the Rotman lens 23 may form a first set of waveguides 52*a* in the transmit planar component 41 and the receive planar component 43. Each waveguide in the first set of waveguides 52*a* may further include one or more polarization rotator(s) 56. In the present embodiment of the front end 10, each waveguide in the first set of waveguides 52*a* in the transmit planar component 41 and the receive planar component 43 includes a first polarization rotator 56A where the first section 56*a* of the first polarization rotator 56 is located nearer the first end 41*a* than the second section 56*c* thereof.

As further shown in FIG. 4, the waveguides 52 extending between the second end 41*b*/43*b* and the array ports 50*b* of the Rotman lens 23 in the transmit planar component 41 and in the receive planar component 43 may form a second set of waveguides 52*b*. Each waveguide 52 in the second set of waveguides 52*b* in the receive planar component 43 may further include one or more polarization rotator 56. In the present embodiment of the front end 10, each waveguide in the second set of waveguides 52*b* in the receive planar component 43 includes a second polarization rotator 56B which is positioned adjacent the array of antennas 22/24 and in which the first section 56*a* of the polarization rotators 56 is nearer the second end 43*b* than the second section 56*c* thereof.

The electromagnetic waves propagating through the present apparatus may be in the Transverse Electric (TE) 10 mode. The polarization of the waves may be altered by the polarization rotators 56 located throughout the transmit front end device 40*a* and the receive front end device 42*a*.

Waves originating from the transmit logic 12 are polarized to be perpendicular to the plane of the Rotman lens 23 (FIG. 7B) but undergo a 90-degree polarization rotation or twist to become polarized parallel to the plane of the Rotman lens (FIG. 9B) as the waves propagate through the first polarization rotators 56A of the first set of waveguides 52*a* of the transmit planar component 41. Specifically, the waves move through the first polarization rotator 56A (i.e., the first section 56*a*, the iris section 56*b* and the second section 56*c* thereof), and the E-plane of the waves is polarized to be parallel to the plane of the Rotman lens 23 of the transmit planar component 41. Thereafter, the polarization of the waves may be unchanged by propagation through the rest of the transmit front end device 40*a*, including the Rotman lens 23, before being transmitted from the transmit antennas 22. If the transmit planar component 41 is oriented to be horizontal about the ground, the polarization of the waves would change from vertical to horizontal in the transmit front end device 40*a*.

As shown in FIGS. 2-4, the linear array of receive antennas 24 is arranged perpendicularly relative to the linear array of transmit antennas 22. Despite this configuration, the receive antennas 24 of the receive front end device 42*a* may detect the waves that were horizontally polarized and were transmitted by the transmit front end device 40*a*. The detection of these waves may be improved by the fact that the receive front end device 42*a* includes two set of polarization rotators 56A, 56B. In other words, the waves arriving at the receive antennas 24 may undergo another 90-degree polarization rotation by the second polarization rotators 56B of the second set of waveguides 52*b* in the receive planar component 43. Specifically, the waves move through the first section 56*a*, the iris section 56*b* and the second section 56*c* (from FIG. 7B to FIG. 9B) of the second polarization rotator 56B and are polarized to become parallel the plane of the Rotman lens 23 of the receive planar component 43 (or vertical if the receive planar component 43 is positioned vertically about the ground surface). After these detected waves propagate through the Rotman lens, the polarization of these waves may undergo yet another 90-degree polarization rotation at the first polarization rotators 56A of the first set of waveguides 52*a* of the receive planar component 43. Specifically, the waves move through the second section 56*c*, the iris section 56*b*, and the first section 56*a* (from FIG. 9B to FIG. 7B) of the first polarization rotators 56A and are polarized to become perpendicular to the plane of the Rotman lens 23 of the receive planar component 43 12 (i.e., with a horizontal polarization about the ground surface if the receive front end device is perpendicular to the ground surface). The waves thus reach the receive logic 14 at the same polarization relative to the phased array logic at which the waves were transmitted from the transmit logic 12.

The first set of waveguides 52*a* in the transmit planar component 41, the second set of waveguides 52*b* in the receive planar component 43, and the first set of waveguides 52*a* in the receive planar component 41 make up the three sets of waveguides 52 that include polarization rotators 56 in the present embodiment of the front end 10. Thus, the waves undergo three 90-degree polarization rotations or twists during propagation through the transmit front end device 40*a* and the receive front end device 42*a*.

However, the number of sets of waveguides 52 including polarization rotators 56 may be a different odd number such as one or seven. In an alternative embodiment of the front end 10, there could be polarization rotators 56 in the first set of waveguides 52 on the transmit planar component 41 only and none on the receive planar component 43 such that the total number of sets of waveguides including polarization rotators 56 is one, for example.

Alternatively, while each waveguide in the aforementioned sets of waveguides 52 includes a single polarization rotator 56, it is possible for one waveguide 52 to have more than one polarization rotator 56. For example, each of the first set of waveguides 52*a* extending between the first end 41*a* and the beam ports 50*a* in the transmit planar component 41 may include two polarization rotators 56 (e.g., a first polarization rotator 56A and a second polarization rotator 56B in order of wave propagation), each of the second set of waveguides 52*b* extending between the array ports 50*b* and the second end 41*b* in the transmit planar component 41 may include one polarization rotator 56 (e.g., a first polarization rotator 56A), each the second set of waveguides 52*b* extending between the second end 43*b* and the array ports 50*b* in the receive planar component 43 may include two polarization rotators 56 (e.g., a second polarization rotator 56B and a first polarization rotator 56A in order of wave propagation), and each the first set of waveguides 52*a* extending between the beam ports 50*a* and the first end 43*a* of the receive planar component 43 may include two polarization rotators 56 (e.g., a second polarization rotator 56B and a first polarization rotator 56A in order of wave propagation). In such an alternative arrangement of the polarization rotators 56, there would be a total of seven 90-degree polarization rotations or twists during propagation through the transmit front end device 40*a* and the receive front end device 42*a*.

The expression "90-degree polarization rotation" or other expressions relating to rotating the polarization of the waves by "90-degree" or "90 degrees" are meant to include rotation by 270 degrees, 630 degrees, or the like in the opposite rotational direction or rotation by 450 degrees or the like in the same rotational direction as long as the finally reached position can be reached through a rotation by 90 degrees.

In one example arrangement of the front end 10, the transmit module 40 and the receive module 42 may be configured in a bi-static manner. The bi-static configuration may refer to the working configuration where the receiving module 42 and the transmitting module 40 are separated or not co-located. The illustrated example shows that the vertically arranged receive module 42 is configured to be in a receiving mode while the horizontally arranged transmit module 40 is configured to be in a transmission mode. The bi-static Tx/Rx configuration of the two phased array modules may be fixed or switchable. In some cases, the vertical receive module 42 and horizontal transmit module 40 can be switched such that the vertical module is the transmitter and the horizontal module is the receiver.

If the radar system is in the bi-static Tx/Rx configuration, one or more parameters of the antenna arrays (e.g., gain, directivity) for the receiving and transmitting may be different. Similarly, one or more configurations of the Rotman lens or RF absorbers corresponding to one (transmit/receive) front-end device may be different from those of the perpendicularly arranged (receive/transmit) front-end device.

In alternative embodiment (FIG. 10), the front end 10 may feed an array of microstrip patch antennas using microstrip delay-line beamformer. The microstrip patch antennas may be fabricated using printed circuit board technologies. The patch antennas are resonant antennas fed by a true time delay microstrip beamformer without using a lens. An array of Vivaldi antennas may also be connected to the microstrip-based Rotman lens. This may advantageously provide a device with compact and smaller structure, improved accuracy and easy fabrication. In an example receiving module, the patch antennas may be selected (e.g., by selecting patch size and location) such that the patch array operates at the center frequency which is about 78.5 GHz. In some embodiments, the patch array may comprise 32 patches. Those skilled in the art will appreciate that other number of patches that is smaller than or greater than 32 can be utilized.

Obviously, numerous modifications and variations of the present invention are possible in light of the above teachings. It is therefore to be understood that within the scope of the appended claims, the invention may be practiced otherwise than as specifically described herein.

What is claimed is:

1. A front end of a radar system comprising:
 a substrate through which electromagnetic waves propagate, the substrate including:
  a first end;
  a second end located opposite the first end;
  a cavity space bounded by beam ports along a first side of the cavity space and by array ports along a second side of the cavity space, the cavity space being in operative communication with the beam ports and with the array ports to form a Rotman lens, the cavity space further bounded by radio frequency absorbers along a third side and a fourth side of the cavity space, the second side located opposite the first side, the fourth side located opposite the third side; and
 an array of antennas located along the second end of the substrate, each of the antennas being in operative communication with a corresponding one of the array ports,
  wherein the radio frequency absorbers include triangular teeth having vertices, and the triangular teeth are arranged such that lines extending between adjacent vertices are substantially normal to a curvature of a wavefront of the waves in the cavity space during operation of the front end of the radar system,
  wherein the substrate comprises a first set of waveguides that extend between the first end of the substrate and the beam ports and a second set of waveguides that extend between the array ports and the second end of the substrate, each waveguide of the first set of waveguides and the second set of waveguides including a hollow space inside the waveguide and extending in a longitudinal direction from one end of the waveguide to an opposite end of the waveguide, the hollow space having a rectangular cross-section,
  wherein each waveguide in the first set of waveguides of the substrate includes a first polarization rotator,
  wherein each waveguide in the second set of waveguides of the substrate includes a second polarization rotator,
  wherein each of the first polarization rotator and the second polarization rotator includes a corresponding first section, a corresponding iris section, and a corresponding second section in the longitudinal direction,
  wherein, for each of the first polarization rotator and the second polarization rotator, the corresponding first section includes a first set of obstructions that protrude into the hollow space, the corresponding iris section includes second set of obstructions that protrude into the hollow space, and the corresponding second section includes a third set of obstructions that protrude into the hollow space.

2. The front end of claim 1, wherein a number of polarization rotators in both the first set of waveguides and the second set of waveguides is selected such that a wave provided to an input of the substrate is rotated by 90-degrees at an output of the substrate.

3. The front end of claim 1, wherein the obstructions of the first set of obstructions extend from opposite surfaces within the first section.

4. The front end of claim 1, wherein the obstructions of the second set of obstructions extend from diagonally opposite corners of the iris section.

5. The front end of claim 4, wherein a total effective bandwidth of the front end is based on a height of the obstructions within the iris section.

6. The front end of claim 4, wherein an effective band center of the front end is based on a length of the obstructions within the iris section.

7. The front end of claim 4, wherein an insertion loss is based on a gap size in the iris section.

8. The front end of claim 1, wherein the obstructions of the third set of obstructions extend from opposite surfaces within the second section.

9. The front end of claim 1, wherein the first section, the iris section and the second section are arranged such that the first section is nearer the first end than the second section in the first polarization rotator, and wherein the first section, the iris section and the second section are arranged such that the first section is nearer the second end than the second section in the second polarization rotator.

10. The front end of claim 1, wherein during operation of the front end, waves are rotated by 90 degrees during propagation through the first polarization rotator or the second polarization rotator.

11. The front end of claim 1, wherein the front end includes transmit logic circuitry or receive logic circuitry.

12. The front end of claim 1, wherein the substrate is formed from a first block and a second block, each of the first block and the second block forms a symmetrical half substrate.

13. The front end of claim 1, wherein the array of antennas of the front end are in a bi-static configuration.

14. The front end of claim 1, wherein the array of antennas is a phased array of antennas.

15. The front end of claim 1, wherein the array of antennas is an array of microstrip patch antennas.

16. The front end of claim 1, wherein the array of antennas is an array of Vivaldi antennas.

* * * * *